(12) United States Patent
Ohshika et al.

(10) Patent No.: US 8,124,023 B2
(45) Date of Patent: Feb. 28, 2012

(54) HOLDING SEALING MATERIAL, METHOD FOR MANUFACTURING HOLDING SEALING MATERIAL AND EXHAUST GAS PURIFYING APPARATUS

(75) Inventors: Koji Ohshika, Ogaki (JP); Satoru Kariya, Ogaki (JP)

(73) Assignee: Ibiden Co., Ltd., Ogaki-shi (JP)

( * ) Notice: Subject to any disclaimer, the term of this patent is extended or adjusted under 35 U.S.C. 154(b) by 379 days.

(21) Appl. No.: 12/464,913

(22) Filed: May 13, 2009

(65) Prior Publication Data
US 2009/0285726 A1 Nov. 19, 2009

(30) Foreign Application Priority Data
May 15, 2008 (JP) .................................. 2008-128820

(51) Int. Cl.
*B01D 50/00* (2006.01)
(52) U.S. Cl. ...................................................... 422/179
(58) Field of Classification Search .................. 422/179; 428/221, 292.1, 297.1
See application file for complete search history.

(56) References Cited

U.S. PATENT DOCUMENTS

| | | | | |
|---|---|---|---|---|
| 4,048,363 A | * | 9/1977 | Langer et al. | ................... 428/77 |
| 4,999,168 A | | 3/1991 | Ten | |
| 5,332,609 A | * | 7/1994 | Corn | ................................. 428/77 |
| 5,384,188 A | * | 1/1995 | Lebold et al. | ................... 442/414 |
| 6,613,295 B1 | | 9/2003 | Kageyama et al. | |
| 7,179,429 B1 | * | 2/2007 | Maus | ............................. 422/179 |
| 7,820,117 B2 | * | 10/2010 | Peisert et al. | ................... 422/179 |
| 7,854,904 B2 | * | 12/2010 | Merry | ............................ 422/179 |
| 2009/0022633 A1 | * | 1/2009 | Tomosue et al. | ............... 422/177 |

FOREIGN PATENT DOCUMENTS

| | | |
|---|---|---|
| EP | 0396331 | 11/1990 |
| JP | 2004-204819 | 7/2004 |

OTHER PUBLICATIONS

Chinese Office Action for corresponding CN Application No. 200910134024.5, Jun. 2, 2011.

* cited by examiner

*Primary Examiner* — Tom Duong
(74) *Attorney, Agent, or Firm* — Ditthavong Mori & Steiner, P.C.

(57) ABSTRACT

A holding sealing material includes a needle mat, a sheet-processed mat, and a sheet-processed mat. The needle mat includes entangled first inorganic fibers and a binder. The sheet-processed mat includes a binder and second inorganic fibers processed into a sheet. The needle mat and the sheet-processed mat are laminated together. Staple fibers having an average fiber length shorter than an average fiber length of the second inorganic fibers are localized in an interface area extending inside the needle mat from an interface between the needle mat and the sheet-processed mat. A binder content of the interface area is higher than a binder content of the needle mat in terms of weight ratio.

42 Claims, 8 Drawing Sheets

A-A line cross-sectional view

Crack

HOLDING SEALING MATERIAL, METHOD FOR MANUFACTURING HOLDING SEALING MATERIAL AND EXHAUST GAS PURIFYING APPARATUS

CROSS-REFERENCE TO RELATED APPLICATIONS

The present application claims priority under 35 U.S.C. §119 to Japanese Patent Application No. 2008-128820, filed on May 15, 2008, the contents of which are incorporated herein by reference in their entirety.

BACKGROUND OF THE INVENTION

1. Field of the Invention

The present invention relates to a holding sealing material, a method for manufacturing a holding sealing material and an exhaust gas purifying apparatus.

2. Discussion of the Background

Exhaust gases discharged from internal combustion engines such as a diesel engine contain particulate matter (hereinafter, also referred to as PM). In recent years, the PM has raised serious problems because it is harmful to the environment and the human bodies. Moreover, since exhaust gases also contain toxic gas components such as CO, HC, and NOx, there have been growing concerns about influences of these toxic gas components on the environment and the human bodies.

In view of these, as an exhaust gas purifying apparatus for capturing PM in exhaust gases and for purifying the toxic gas components, various exhaust gas purifying apparatuses have been proposed. Each of those exhaust gas purifying apparatuses includes: an exhaust gas treating body made of porous ceramics such as silicon carbide and cordierite; a casing for housing the exhaust gas treating body; and a holding sealing material disposed between the exhaust gas treating body and the casing. The holding sealing material is installed mainly for purposes of preventing the exhaust gas treating body from being damaged upon contact with the casing that covers its periphery due to vibrations or impacts caused by traveling or the like of an automobile and preventing exhaust gases from leaking between the exhaust gas treating body and the casing.

In order to improve fuel consumption, the internal combustion engines are operated under conditions close to at an air fuel ratio close to the theoretical air fuel ratio. As a result, the temperature of exhaust gases tends to be higher. Especially, when the internal-combustion engine is operated at a high revolution, the temperature of exhaust gases immediately after discharged from the internal combustion engine may rise to as high as about 1000° C. Thus, exhaust gases at a high temperature may reach the exhaust gas purifying apparatus. Therefore, there is a demand for a holding sealing material that is not damaged, that is, for example, a holding sealing material that does not melt even under such a high temperature.

As a holding sealing material intended for use under a high temperature, there has been proposed a holding sealing material including two inorganic fiber layers: a layer containing alumina fibers; and a layer containing inorganic fibers mainly made of alumina and silica (hereinafter also referred to as ceramic fibers) (JP-A 2004-204819).

The holding sealing material described in JP-A 2004-204819 is provided with moderate heat resistance because it includes the two inorganic fiber layers, that is, the layer containing alumina fibers having a relatively high heat resistance and the layer containing ceramic fibers.

When manufacturing an exhaust gas purifying apparatus, a holding sealing material is wound around an exhaust gas treating body, and the exhaust gas treating body with the holding sealing material wound thereon is slid to be press-fitted into a cylindrical casing. Since the outer diameter of the exhaust gas treating body including the thickness of the holding sealing material is larger than the inside diameter of the casing, a great shear stress is loaded on the holding sealing material upon the press-fitting. Therefore, the holding sealing material is required to have a winding ability, which prevents crack and fracture formation upon winding of the holding sealing material, as well as a strength enough to resist the shear stress loaded upon the press-fitting (hereinafter, also referred to as shear strength).

In the mat described in JP-A 2004-204819, an upper layer is formed by forming a second slurry into a sheet on a lower layer obtained by forming a first slurry into a sheet. Patent Document 1 discloses that the slurries are partially mixed between both layers, resulting in formation of an integrated sheet.

The contents of JP-A 2004-204819 are incorporated herein by reference in their entirety.

SUMMARY OF THE INVENTION

According to one aspect of the present invention, a holding sealing material includes a needle mat, a sheet-processed mat, and a sheet-processed mat. The needle mat includes entangled first inorganic fibers and a binder. The sheet-processed mat includes a binder and second inorganic fibers processed into a sheet. The needle mat and the sheet-processed mat are laminated together. Staple fibers having an average fiber length shorter than an average fiber length of the second inorganic fibers are localized in an interface area extending inside the needle mat from an interface between the needle mat and the sheet-processed mat. A binder content of the interface area is higher than a binder content of the needle mat in terms of weight ratio.

According to another aspect of the present invention, a method for manufacturing a holding sealing material includes needling a mat containing first inorganic fibers to manufacture a needle mat containing the first inorganic fibers entangled. A binder is allowed to adhere to the needle mat. A sheet-forming slurry containing at least second inorganic fibers and a binder is supplied on the needle mat to which the binder adhered. The sheet-forming slurry is maintained on the needle mat for a predetermined time. The sheet-forming slurry is dehydrated to manufacture a sheet-processed mat precursor laminated on the needle mat. The needle mat and the sheet-processed mat precursor laminated on the needle mat are dried.

According to further aspect of the present invention, an exhaust gas purifying apparatus includes an exhaust gas treating body, a casing, and a holding sealing material. The exhaust gas treating body has a plurality of cell walls extending to define a plurality of cells. The casing houses the exhaust gas treating body. The holding sealing material is disposed between the exhaust gas treating body and the casing to hold the exhaust gas treating body. The holding sealing material includes a needle mat and a sheet-processed mat. The needle mat includes entangled first inorganic fibers and a binder. The sheet-processed mat includes a binder and second inorganic fibers processed into a sheet. The needle mat and the sheet-processed mat are laminated together. Staple fibers having an average fiber length shorter than an average fiber length of the second inorganic fibers are localized in an interface area extending inside the needle mat from an interface between the needle mat and the sheet-processed mat. A binder content of the interface area is higher than a binder content of the needle mat in terms of weight ratio.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
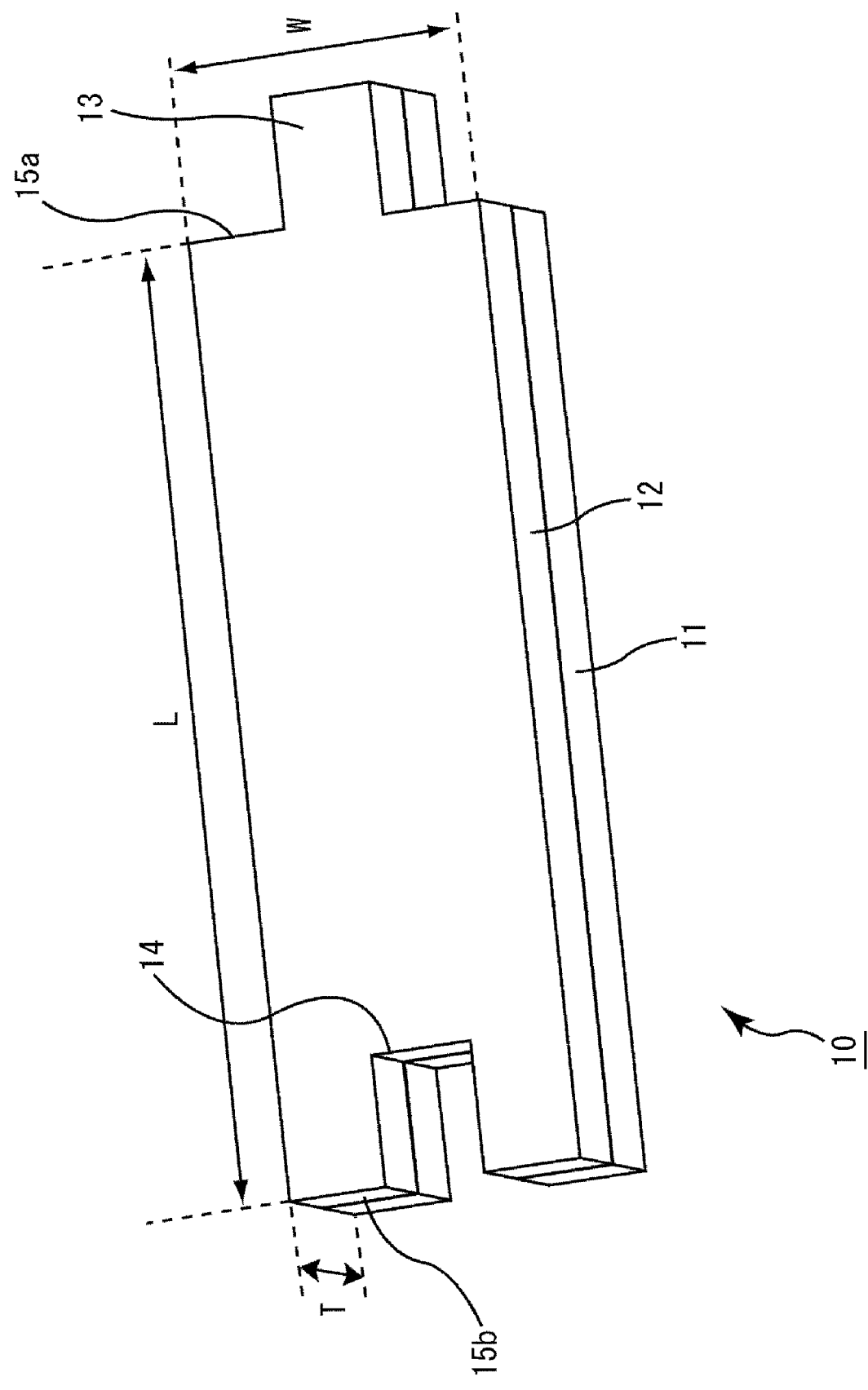
FIG. 1 is a perspective view schematically illustrating a holding sealing material according to one embodiment of the present invention.

Embodiments will now be described with reference to the accompanying drawings, wherein like reference numerals designate corresponding or identical elements throughout the various drawings.

A holding sealing material according to embodiments of the present invention includes: a needle mat including entangled first inorganic fibers and a binder; and a sheet-processed mat including second inorganic fibers processed into a sheet and a binder, the needle mat and the sheet-processed mat being laminated together, wherein staple fibers having a shorter average fiber length than an average fiber length of the second inorganic fibers are localized in an interface area extending from an interface between the needle mat and the sheet-processed mat into the needle mat, and a binder content of the interface area is higher than a binder content of the needle mat in terms of weight ratio.

Since the predetermined staple fibers (made of inorganic fibers) are localized in the interface area in the needle mat, it may be easier to improve the shear strength of the holding sealing material compared to a case where the mats are laminated only with the binder. Thereby, it may be easier to prevent peeling and the like in the holding sealing material caused by the shear stress loaded upon the press-fitting. The reason for this may be, although not certain, that the staple fibers localized in the interface area and the binder are likely to be bound or entangled with each other so that the needle mat and the sheet-processed mat are likely to be strongly joined together.

Here, the interface area is defined as an area extending from the interface between the needle mat and the sheet-processed mat into the needle mat and covering about 5% of the thickness of the holding sealing material. Namely, the interface area is included in the needle mat, that is, a part of the needle mat. The first inorganic fibers and the second inorganic fibers may be entangled with each other in an area where the needle mat and the sheet-processed mat contact so that both mats may partially overlap each other. The interface is defined to include the overlapping portion of both mats because the thickness of the overlapping portion of both mats is generally further thinner than the thickness of the interface area.

Since the binder content of the interface area is higher than the binder content of the needle mat in terms of weight ratio, the staple fibers and the larger amount of the binder are likely to be more firmly bound or entangled with each other. Therefore, it may be easier to further improve the shear strength of the holding sealing material according to the embodiments of the present invention compared to a holding sealing material in which the binder content gradient along the thickness direction of the holding sealing material is not formed.

Here, the binder content of the needle mat is the binder content of the entire needle mat including the interface area, and is not the binder content of an area of the needle mat except the interface area as it is clear from the above-described definition of the interface area.

The holding sealing material according to the embodiments of the present invention includes the needle mat and the sheet-processed mat being laminated together. Since the needle mat originally includes a mat of the entangled first inorganic fibers, the needle mat itself has a property to maintain its shape to a certain degree. Therefore, the needle mat does not need a large amount of the binder to maintain its shape, and needs only a minimum amount of the binder determined based on handleability and the like. Accordingly, it may be easier to form the holding sealing material using a reduced amount of the binder.

In addition, the higher flexibility of the needle mat than that of the sheet-processed mat makes it easier for the needle mat to tightly fit the periphery of the exhaust gas treating body when the holding sealing material is wound around the exhaust gas treating body. Therefore, the holding sealing material according to the embodiments of the present invention tends to have an excellent winding ability that allows the holding sealing material to be favorably wound around the exhaust gas treating body.

In the holding sealing material according to the embodiments of the present invention, the localized staple fibers are desirably oriented across the interface. The localized staple fibers oriented across the interface makes it easier to further improve the shear strength of the holding sealing material. The reason for this may be, although not certain, that the localized staple fibers oriented as described above tend to produce an anchoring effect in the interface area, and the needle mat and the sheet-processed mat are likely to be joined together with an enhanced strength owing to the anchoring effect, thus leading to a tendency of improvement of the shear strength of the holding sealing material.

Here, the wording "oriented across the interface" refers to being in an orientation in which the long axes (or extended lines thereof) of the staple fibers cross the interface.

In the holding sealing material according to the embodiments of the present invention, the binder content of the needle mat is desirably lower than a binder content of the sheet-processed mat in terms of weight ratio. When the holding sealing material with the needle mat having a low binder content is wound around the exhaust gas treating body with the needle mat facing outside (casing side), the exhaust gas treating body is likely to be smoothly press-fitted into the casing. The reason for this may be because the lower the binder content of the holding sealing material is, the smaller the friction coefficient is.

The binder content of the interface area is desirably from about 1.3 times to about 7.0 times larger than the binder content of the needle mat in terms of weight ratio in the holding sealing material according to the embodiments of the present invention. When the binder content of the interface area is from about 1.3 times to about 7.0 times larger than the binder content of the needle mat in terms of weight ratio, it may be easier to improve the shear strength of the holding sealing material as well as to still allow easy formation of the sheet-processed mat. This is explained as follows. Free binders contained in the sheet-forming slurry for the sheet-processed mat increase the binder content of the interface area, and penetration of the binder into the interface area results in the high binder content. Therefore, in order to increase the binder content of the interface area, a sheet-forming slurry is required to contain a certain amount of the binder. When the binder content of the interface area is about 7.0 times larger than the binder content of the needle mat or less in terms of weight ratio, agglomeration of the binder and the like is less likely to occur. Accordingly, a difficulty in forming the sheet-processed mat is less likely to occur. In addition, when binder content of the interface area is about 1.3 times larger than the binder content of the needle mat or more in terms of weight ratio, it may be easier to obtain the required shear strength. From the above-mentioned viewpoints, when the binder content of the interface area is in the predetermined range, it may be easier to further improve the shear strength of the holding sealing material as well as to still allow easy formation of the sheet-processed mat.

The average fiber length of the staple fibers of the holding sealing material according to the embodiments of the present invention is desirably from about 300 μm or less. When the average fiber length of the staple fibers is about 300 μm or less, it may be easier to further improve the shear strength of the holding sealing material. When the average fiber length of the staple fibers is about 300 μm or less, it is easier to prevent deterioration of the anchoring effect produced by the staple fibers, and produce an effect of improving the shear strength of the holding sealing material.

A method for manufacturing a holding sealing material according to embodiments of the present invention includes: needling a mat containing first inorganic fibers to manufacture a needle mat containing the first inorganic fibers being entangled; allowing a binder to adhere to the needle mat; supplying a sheet-forming slurry containing at least second inorganic fibers and a binder on the needle mat with the binder adhered thereto, and then allowing the sheet-forming slurry and the needle mat to stand for a predetermined time; dehydrating the sheet-forming slurry to manufacture a sheet-processed mat precursor; and drying the needle mat and the sheet-processed mat precursor being laminated together.

Since the method according to the embodiments of the present invention includes supplying the sheet-forming slurry containing at least the second inorganic fibers and the binder on the needle mat with the binder adhered thereto and then allowing the sheet-forming slurry and the needle mat to stand for a predetermined time, free binders that are not agglomerated and tiny staple fibers in the sheet-forming slurry tend to precipitate on the needle mat. Thereafter, the slurry is dehydrated so that the staple fibers and the binder penetrate further into a certain depth of the needle mat. As a result, it may be easier to efficiently manufacture a holding sealing material which tends to contain the staple fibers being localized and a large amount of the binder in the interface area. That is, in the method for manufacturing a holding sealing material according to the embodiments of the present invention, it may be easier to suitably manufacture a holding sealing material according to the embodiments of the present invention which has a high shear strength and an excellent winding ability and is easily manufactured by using a reduced amount of the binder.

When the slurry is dehydrated, the staple fibers having precipitated on the needle mat penetrate into the interface area in the needle mat and show a tendency of being oriented across the interface (a tendency of being angled with respect to the interface). Therefore, the staple fibers are likely to contribute to improvement of the shear strength of the holding sealing material.

In the method for manufacturing a holding sealing material according to the embodiments of the present invention, the amount of the binder adhered to the needle mat is desirably less than the binder content of the sheet-forming slurry. This is likely to allow the holding sealing material to exert an excellent press-fitability when the holding sealing material is wound around the exhaust gas treating body with the needling mat having a low frictional resistance facing to the casing because resistance generated upon the press-fitting tends to be low.

In the method for manufacturing a holding sealing material according to the embodiments of the present invention, a standing time of the slurry is desirably from about 10 seconds to about 60 seconds. When the standing time of the slurry is from about 10 seconds to about 60 seconds, it may be easier to allow required amounts of the staple fibers and the binder to precipitate, and to suitably manufacture the holding sealing material according to the embodiments of the present invention without sacrificing manufacturing efficiency.

An exhaust gas purifying apparatus according to embodiments of the present invention includes: an exhaust gas treating body having a large number of cells placed longitudinally in parallel with one another with a cell wall interposed therebetween; a casing for housing the exhaust gas treating body; and a holding sealing material disposed between the exhaust gas treating body and the casing to hold the exhaust gas treating body, wherein the holding sealing material is the holding sealing material according to the embodiments of the present invention.

Peeling and the like is less likely to occur in the holding sealing material upon press-fitting the exhaust gas treating body with the holding sealing material wound thereon into the casing because the holding sealing material having a high shear strength is used in the exhaust gas purifying apparatus according to the embodiments of the present invention. Therefore, the exhaust gas purifying apparatus according to the embodiments of the present invention is likely to be smoothly assembled. In the case where a fracture or a crack occurs in the holding sealing material, exhaust gases are likely to leak therefrom. Since the holding sealing material having an excellent winding ability is used in the exhaust gas purifying apparatus according to the embodiment of the present invention, it may be easier to prevent fracture and crack formation in the holding sealing material, which may in turn tend to prevent leakage of exhaust gases from the exhaust gas purifying apparatus.

First Embodiment

The following description will discuss a first embodiment which is one embodiment of the holding sealing material and the method for manufacturing a holding sealing material according to one embodiment of the present invention.

FIG. 1 is a perspective view schematically illustrating the holding sealing material of the present invention. The holding sealing material 10 of the present embodiment has an almost rectangle shape in a plane view with a predetermined length (indicated by an arrow L in FIG. 1), a predetermined width (indicated by an arrow W in FIG. 1), and a predetermined thickness (indicated by an arrow T in FIG. 1).

The holding sealing material 10 has end faces 15a and 15b. A projected portion 13 is formed on the end face 15a, and a recessed portion 14 is formed on the end face 15b on the other side. The projected portion 13 and recessed portion 14 are designed to have shapes which complementarily fit to each other when the holding sealing material 10 is wound around an exhaust gas treating body to assemble an exhaust gas purifying apparatus to be described later.

The holding sealing material 10 has a two-layer structure in which a needle mat 11 containing entangled first inorganic fibers and a sheet-processed mat 12 containing second inorganic fibers processed into a sheet are laminated.

The needle mat 11 is formed by carrying out a needling treatment on a base mat of the first inorganic fibers. Here, the needling treatment refers a treatment in which a fiber entangling means such as a needle is inserted into and pulling out from the base mat. The needle mat 11 has a structure in which the first inorganic fibers that are comparatively longer than the second inorganic fibers forming the sheet-processed mat 12 are entangled with one another three-dimensionally by the needling treatment, and a binder are present in the entangled structure of the first inorganic fibers to reinforce the entangled structure of the first inorganic fibers. Thus, since the needle mat 11 is likely to maintain its shape owing to the entangled first inorganic fibers, only a small amount of the binder is required for reinforcing the entangled structure. In order to form the entangled structure, the first inorganic fibers have a certain fiber length, for example, an average fiber length of about 0.5 cm to about 10 cm.

On the other hand, the sheet-processed mat 12 is formed as a layer by processing a sheet-forming slurry containing the second inorganic fibers into a sheet. The second inorganic fibers are less likely to form the entangled structure because the second inorganic fibers are comparatively shorter than the first inorganic fibers. Therefore, the sheet-processed mat 12 has less ability to maintain its shape than the needle mat. Consequently, a larger amount of the binder than that used in the needle mat 11 is used to reinforce the three-dimensional structure of the second inorganic fibers in the sheet-processed mat 12 so that the sheet-processed mat 12 is likely to maintain its shape. The average fiber length of the second inorganic fibers may be from about 0.2 mm to about 20 mm, considering handleability of the slurry-form raw material of the sheet-processed mat upon forming the sheet-processed mat.

In the holding sealing material of the present embodiment, the staple fibers having an average fiber length shorter than the average fiber length of the second inorganic fibers are localized in the interface area extending from the interface between the needle mat and the sheet-processed mat into the needle mat, and the binder content of the interface area is higher than the binder content of the needle mat in terms of weight ratio. The aspect will be described with reference to FIG. 2A and FIG. 2B.

Figure 2A:
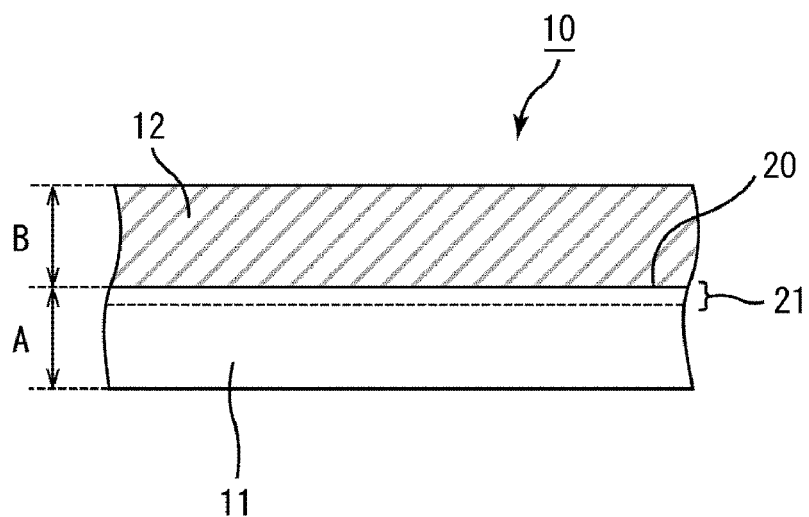
FIG. 2A is a side view schematically illustrating a cross-section of the holding sealing material according to one embodiment of the present invention.
Figure 2B:
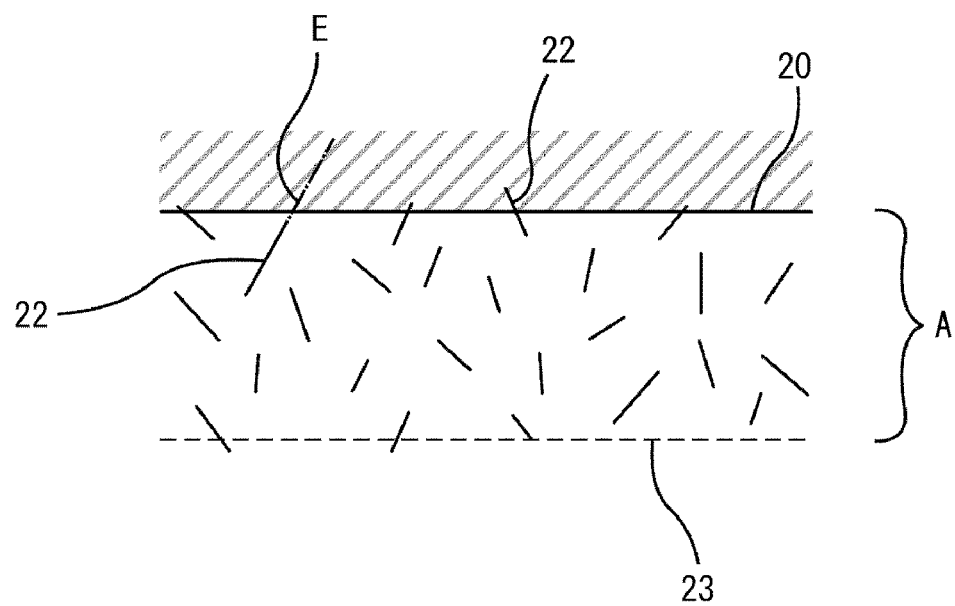
FIG. 2B is an enlarged cross-sectional view of an interface area in the cross-section of FIG. 2A.

FIG. 2A is a side view schematically illustrating a cross-section of the holding sealing material according to one embodiment of the present invention, and FIG. 2B is an enlarged cross-sectional view of the interface area in the cross-section of FIG. 2A.

As described above, the needle mat 11 and the sheet-processed mat 12 are laminated in the holding sealing material 10. The needle mat 11 occupies the area A shown in the figures along the thickness direction T of the holding sealing material 10, and the sheet-processed mat 12 occupies the area B shown in the figure.

The interface 20 exists between the needle mat 11 and the sheet-processed mat 12, and is defined as a contacting area of both. The interface area 21 extends from the interface 20 into the needle mat 11 and covers about 5% of the thickness of the holding sealing material. Therefore, the interface area 21 is also a part of the area A that is occupied by the needle mat 11.

FIG. 2B is an enlarged view of the interface area 21.

Staple fibers 22 having an average fiber length shorter than the average fiber length of the second inorganic fibers forming the sheet-processed mat 12 are localized in the interface area 21 as shown in FIG. 2B. Needless to say, the staple fibers 22 do not exist only in the interface area 21. However, a larger amount of the staple fibers tend to exist in the interface area 21 compared to those existing in the area A which is occupied by the needle mat 11 except the interface area (namely, the staple fibers are localized). In addition to the staple fibers 22 existing only in the area between the interface 20 and the terminal plane 23 of the opposite side of the interface area 21 to the interface 20, some staple fibers 22 exist crossing the interface 20 and some staple fibers exist crossing the terminal plane 23. All these staple fibers are referred to as the staple fibers.

The binder content of the interface area 21 is higher than the binder content of the needle mat 11. The reason for the higher binder content of the interface area 21 may be that the binder contained in the sheet-forming slurry for the sheet-processed mat 12 has moved to the interface area 21 as will be described later. The binder content of the needle mat 11 refers to not the binder content of the remaining area of the area A of FIG. 2A except the interface area 21 but the binder content of the entire area A that is occupied by the needle mat 11 including the interface area.

Thus, the binder content of the interface area 21 only needs to be higher than the binder content of the needle mat 11. Specifically, the desirable binder content of the interface area is from about 1.3 times to about 7.0 times larger than the binder content of the needle mat in terms of weight ratio. The high binder content of the interface area results from the free binders contained in the sheet-forming slurry as will be described later. Therefore, the sheet-forming slurry requires a certain amount of the binder. When the binder content of the interface is about 7.0 times larger than the binder content of the needle mat or less in terms of weight ratio, a problem such as agglomeration of the binder is likely to occur. Accordingly, a difficulty in forming the sheet-processed mat is less likely to occur. In addition, when the binder content of the interface is about 1.3 times larger than the binder content of the needle mat or more in terms of weight ratio, it may be easier to the required shear strength. By setting the binder content of the interface area in the predetermined range considering these problems, it may be easier to further improve the shear strength of the holding sealing material as well as to still allow easy formation of the sheet-processed mat.

The staple fibers 22 are localized in the interface area 21, and the binder content of the interface area 21 is higher than the binder content of the needle mat 11 in the holding sealing material 10 of the present embodiment. The staple fibers 22, the binder, and the first inorganic fibers forming the needle mat 11 are likely to be bonded firmly together, and tend to act as if a joint layer for joining the needle mat 11 and the sheet-processed mat 12 together. The coexistence of the staple fibers and the binder makes it easier to improve the shear strength of the holding sealing material 10.

Although the staple fibers 22 localized in the interface area 21 tend to produce the effects for improving the shear strength in the holding sealing material 10 of the present embodiment, the localized staple fibers 22 are particularly desirable to be oriented with their extended lines E of the long axes crossing the interface 20, as shown in FIG. 2B, not in the direction parallel to the interface 20. Staple fibers 22 oriented across the interface 20 are angled with respect to the interface 20 and along the thickness direction of the holding sealing material 10. When the localized staple fibers 22 are angled with respect to the interface 20, the staple fibers 22 together with the binder in the interface area 21 tend to produce an anchoring effect, and thereby makes it easier to improve the joining strength between the sheet-processed mat 12 and the needle mat 11, which may in turn tend to improve the shear strength of the holding sealing material.

The staple fibers 22 are determined to be localized in the interface area 21 when a predetermined number or more staple fibers 22 among a unit fiber number of the staple fibers (for example, 100 fibers) are found in the interface area 21 in random observation of a fiber sample by an optical microscope or the like. Here, the fiber sample is obtained by disentangling and dispersing the interface area removed by separating the needle mat 11 and the sheet-processed mat 12 from each other. The predetermined number may be changed depending on the required shear strength or intended use of the holding sealing material. For example, when the holding sealing material is used for an exhaust gas purifying apparatus connected to an internal combustion engine such as a vehicle, a ratio of localized staple fibers of about 50/100 (about 50 fibers among 100 fibers) may be used. The average fiber length of the staple fibers is not particularly limited as long as it is shorter than the average fiber length of the second inorganic fibers. Specifically, inorganic fibers having an average fiber length of about 300 μm or less are suitably used.

Here, the procedure of how to obtain the fiber sample by disentangling and dispersing the interface area removed by separating the needle mat and the sheet-processed mat from each other is described below. The needle mat and the sheet-processed mat can be carefully separated by hand without using a complicated apparatus or the like. Specifically, an about 50 mm square sample for the separation is punched out from the holding sealing material. The thickness of the punched-out sample is measured, and a value equivalent to about 5% of the thickness is determined. Subsequently, the needle mat and the sheet-processed mat are slowly peeled off from each other by a hand placed around the interface between the needle mat and the sheet-processed mat on one side of the punched-out sample. Thus, the needle mat and the sheet-processed mat can be separated from each other. However, a part of the sheet-processed mat may remain on the needle mat after the separation of the needle mat and the sheet-processed mat. In this case, the remaining part of the sheet-processed mat may further be peeled off with care by hand, a spatula or the like.

Thereafter, the thickness of the separated needle mat is measured. Subsequently, a portion of the needle mat is carefully peeled off from the surface having contacted the sheet-processed mat to obtain a piece of the needle mat having a thickness equivalent to about 5% of the thickness of the holding sealing material which has been determined in advance, considering the measured thickness of the needle mat. More specifically, (1) a thin portion of the needle mat is peeled off by hand or a spatula from the surface having contacted the sheet-processed mat, and then (2) the thickness of the peeled needle mat is measured. The above-mentioned processes (1) and (2) are repeated until the peeled needle mat comes to have a thickness determined by subtraction of the thickness equivalent to about 5% of the thickness of the holding sealing mat which has been determined in advance from the thickness of the needle mat obtained by the separation. The interface area thus obtained is fired for about 1 hour at a temperature of about 600° C. to remove the binder so that each inorganic fiber can be disentangled. Next, each inorganic fiber is carefully disentangled by hand, a spatula or the like for measurement of the fiber length. Samples of the inorganic fibers are extracted at random out of the disentangled inorganic fibers, and the fiber lengths thereof are measured to determine a ratio of the localization of the staple fibers.

Next, the configuration of an exhaust gas purifying apparatus of the present embodiment provided with the holding sealing material of the present embodiment is described with reference to FIGS. 3A and 3B.

Figure 3A:
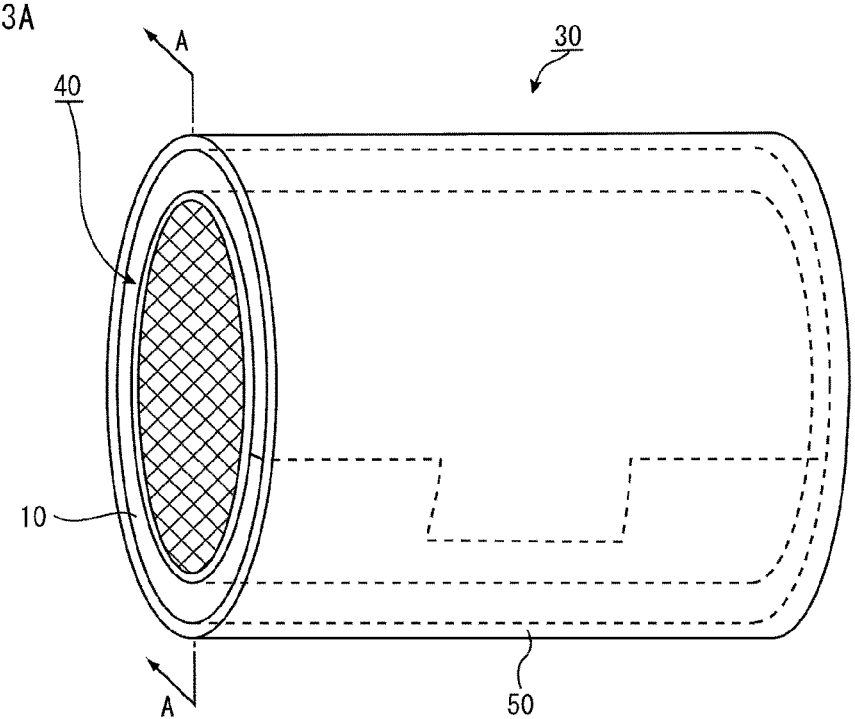
FIG. 3A is a perspective view schematically illustrating an exhaust gas purifying apparatus of the first embodiment.
Figure 3B:
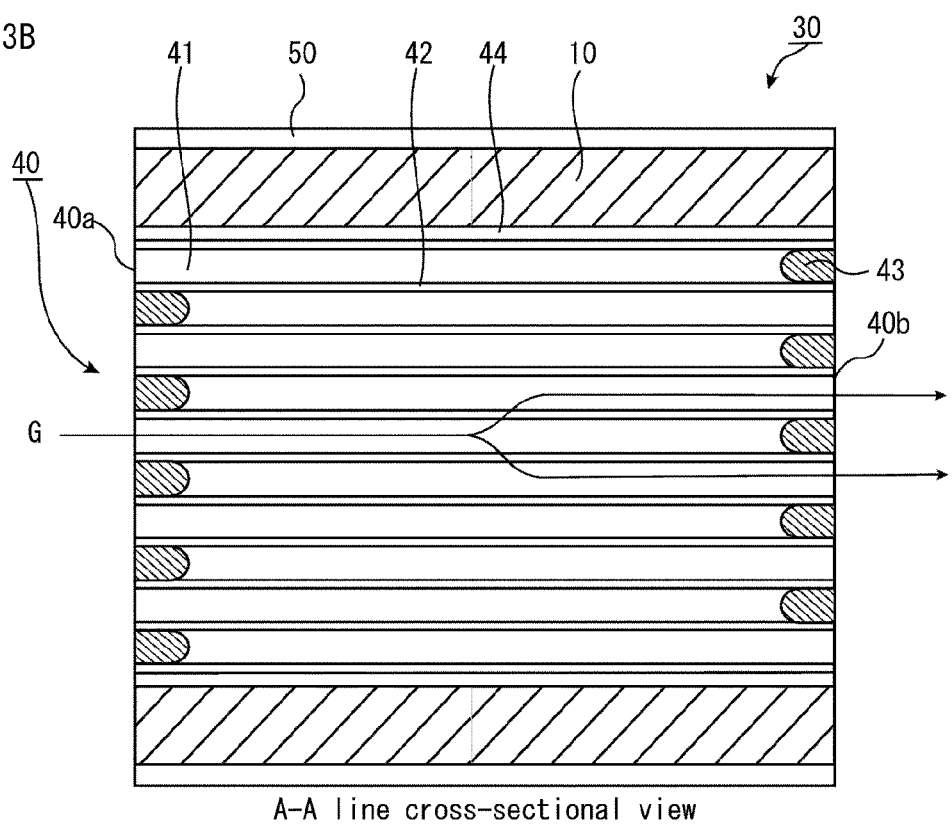
FIG. 3B is an A-A line cross-sectional view of the exhaust gas purifying apparatus shown in FIG. 3A.

FIG. 3A is a perspective view schematically illustrating the exhaust gas purifying apparatus of the present embodiment, and FIG. 3B is an A-A line cross-sectional view of the exhaust gas purifying apparatus shown in FIG. 3A.

As shown in FIGS. 3A and 3B, the exhaust gas purifying apparatus 30 is configured with a pillar-shaped exhaust gas treating body 40 having a large number of cells 41 placed longitudinally in parallel with one another with a cell wall 42 interposed therebetween; a casing 50 for housing the exhaust gas treating body 40; and a holding sealing material 10 disposed between the exhaust gas treating body 40 and the casing 50 to hold the exhaust gas treating body 40.

An introducing pipe for introducing exhaust gases discharged from an internal combustion engine, and the exhaust pipe for discharging the exhaust gases having passed through the exhaust gas purifying apparatus to outside may be coupled to the ends of the casing 50, if necessary.

In the exhaust gas purifying apparatus 30 of the present embodiment, a honeycomb filter with its cells sealed at either one end with a plug 43 is used as the exhaust gas treating body 40, as shown in FIG. 3B.

The exhaust gas purifying apparatus 30 having the above-described configuration through which exhaust gases pass is described below with reference to FIG. 3B.

Exhaust gases discharged from the internal combustion engine flow into the exhaust gas purifying apparatus 30. As shown in FIG. 3B, the exhaust gases (the exhaust gases are shown as G and gas flows are shown as arrows in FIG. 3B) flow into the cell 41 having an opening on the exhaust gas inlet end 40a and pass through the cell wall 42 separating the cells 41. At this time, PM in the exhaust gases is captured in the cell wall 42 so that the exhaust gases are purified. The purified exhaust gases are discharged outside from another cell 41 having an opening on the exhaust gas outlet end 40b.

Next, the honeycomb filter and the casing forming one component of the exhaust gas purifying apparatus 30 are described with reference to FIGS. 4A and 4B.

The structure of the holding sealing material 10 has been described. Therefore, the description thereof is omitted.

Figure 4A:
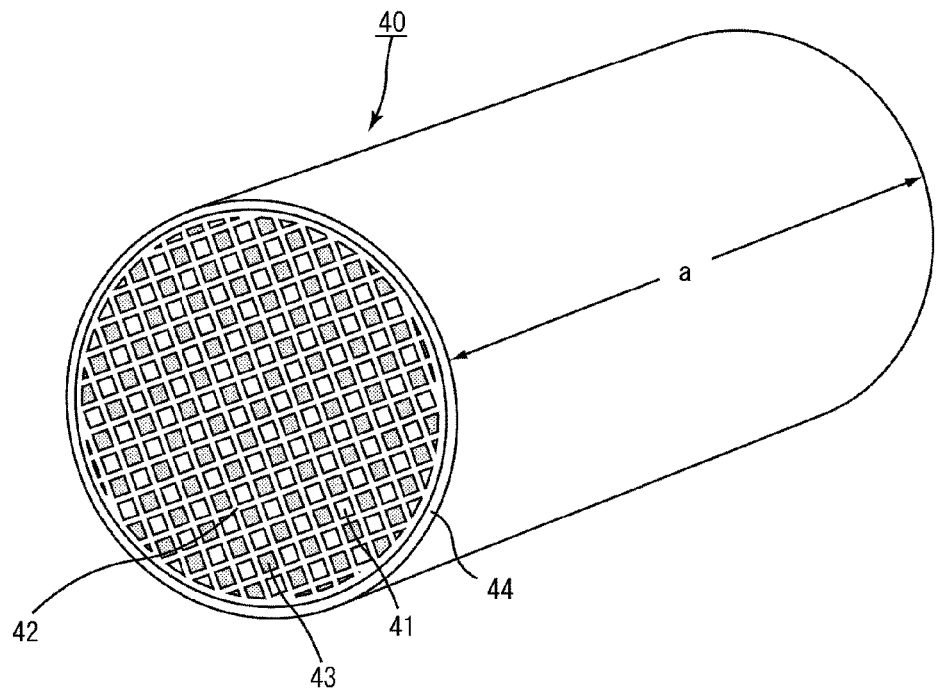
FIG. 4A is a perspective view schematically illustrating a honeycomb filter forming one component of the exhaust gas purifying apparatus of the first embodiment.
Figure 4B:
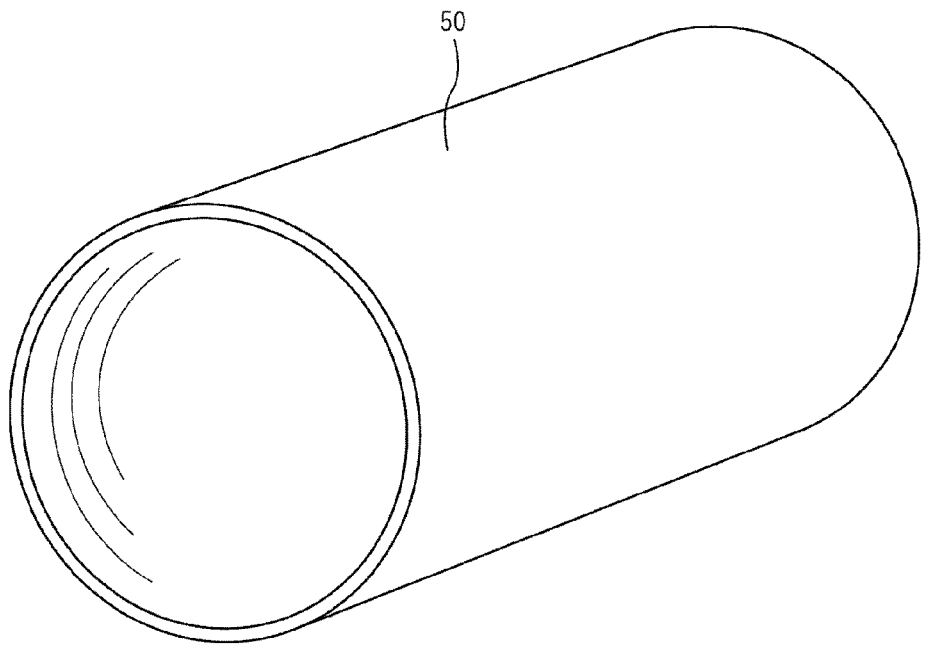
FIG. 4B is a perspective view schematically illustrating a casing forming one component of the exhaust gas purifying apparatus of the first embodiment.

FIG. 4A is a perspective view schematically illustrating the honeycomb filter forming one component of the exhaust gas purifying apparatus of the first embodiment, and FIG. 4B is a perspective view schematically illustrating the casing forming one component of the exhaust gas purifying apparatus of the first embodiment.

As shown in FIG. 4A, a honeycomb filter 40 mainly includes porous ceramics and has a substantially round pillar shape. A holding sealing material layer 44 is formed on the periphery of the honeycomb filter 40 for the purposes of reinforcing the peripheral portion of the honeycomb filter 40, adjusting the shape of the peripheral portion thereof and improving insulation properties of the honeycomb filter 40.

The internal structure of the honeycomb filter 40 has already been described in the description of the exhaust gas purifying apparatus of the present embodiment (see FIG. 3B).

Next, the casing 50 is described. The casing 50 shown in FIG. 4B is mainly made of a metal such as stainless, and has a substantially circular cylindrical shape. The casing 50 has an inside diameter that is slightly smaller than the sum of the diameter of the honeycomb filter 40 and the thickness of the holding sealing material wound around the honeycomb filter 40, and almost the same length as the length of the honeycomb filter 40 in the longitudinal direction (a direction of an arrow a in FIG. 4A).

Next, a method for manufacturing the holding sealing material of the present embodiment and a method for manufacturing an exhaust gas purifying apparatus of the present embodiment are described.

First, the method for manufacturing a holding sealing material is described. The method for manufacturing a holding sealing material of the present embodiment includes: needling a mat containing first inorganic fibers to manufacture a needle mat containing the first inorganic fibers being entangled; allowing a binder to adhere to the needle mat; supplying a sheet-forming slurry containing at least second inorganic fibers and a binder on the needle mat with the binder adhered thereto, and then allowing the sheet-forming slurry and the needle mat to stand for a predetermined time; dehydrating the sheet-forming slurry to manufacture a sheet-processed mat precursor; and drying the needle mat and the sheet-processed mat precursor being laminated together. Hereinafter, the method will be described in the order of processes.

(1) Needle Mat Manufacturing Process

The needle mat can be manufactured by carrying out the above-described needling treatment on the base mat. The base mat has a structure in which the first inorganic fibers having a predetermined average fiber length have become loosely entangled with one another through a spinning process. By carrying out the needling treatment on the first inorganic fibers thus loosely entangled with one another, the first inorganic fibers tend to become more complicatedly entangled with one another so that a mat having an entangled structure that easily maintains its shape to a certain degree without the presence of a binder is easily formed.

Although not particularly limited, examples of the first inorganic fibers include alumina fibers, ceramic fibers and silica fibers. These materials may be altered depending on properties and the like required for the holding sealing material, such as heat resistance and wind erosion resistance. When alumina fibers are used as the first inorganic fibers, fibers having, for example, a composition ratio of alumina:silica=about (60:40) to about (99:1) may be used.

The needling treatment can be carried out by using a needling device. The needling device is configured by: a supporting plate for supporting the base mat; and a needle board that is disposed above this supporting plate and reciprocably movable in a sticking direction (thickness direction of the base mat). A large number of needles are attached to the needle board. This needle board is shifted relative to the base mat mounted on the supporting plate, and the large number of needles are inserted into and removed from the base mat so that the first inorganic fibers forming the base mat tend to be entangled complicatedly. The number of the needling treatments and the number of the needles may be altered in accordance with the target bulk density, basis weight, and the like.

(2) Binder Adhesion Process

A binder is allowed to adhere to the needle mat that has thus undergone the needling treatment. By allowing the binder to adhere to the needle mat, the first inorganic fibers tend to be more firmly entangled with each other, and the volume of the needle mat tends to be suppressed.

An emulsion, prepared by dispersing an acrylic latex, a rubber latex, or the like, in water, may be used as the binder. This binder is sprayed uniformly over the entire needle mat by using a spray or the like so that the binder is allowed to adhere to the needle mat.

Thereafter, in order to remove moisture from the binder liquid, the needle mat is dried. The needle mat may be dried while being compressed, if necessary. The drying conditions are set to, for example, at a temperature of about 100° C. to about 200° C. for about 3 minutes to about 20 minutes under a pressure of about 30 kPa to about 200 kPa for compression. Through the drying treatment, the needle mat of the present embodiment can be manufactured.

(3) Sheet-Forming Slurry Preparation Process

Next, a sheet-forming slurry used as a raw material of the sheet-processed mat is prepared. The sheet-forming slurry mainly contains water as a dispersion medium, the second inorganic fibers, the binder, and a flocculent.

The second inorganic fibers are obtained by spreading raw material fibers, such as alumina fibers. A fiber spreading apparatus such as a feather mill can be used for spreading the fibers. The second inorganic fibers can be obtained by spreading the raw material to a desired extent.

About 1 part by weight of the second inorganic fibers thus obtained are dispersed in 100 parts by weight of water, and stirred. Subsequently, the binder is added and stirred, and then the flocculant is added and further stirred. The addition of the flocculant causes agglomeration of the second inorganic fibers and the binder so that a sheet-forming slurry in a kind of colloidal form is prepared.

An organic binder such as latex, or an inorganic binder such an alumina sol can be used as the binder. Although not particularly limited, the amount of the binder may be from about 1 part by weight to about 30 parts by weight with respect to 100 parts by weight of the second inorganic fibers. A flocculant such as an anionic polymer flocculant and a cationic polymer flocculant can be used as the flocculent. The amount of the flocculant is also not particularly limited, and may be from about 0.1% by weight to about 3.0% by weight.

(4) Standing Process

The needle mat manufactured in advance is placed on a filtration mesh set in the forming device, and a predetermined amount of the sheet-forming slurry is supplied from above the needle mat.

After the sheet-forming slurry is supplied, the layer of the needle mat and the layer of the sheet-forming slurry are allowed to stand for a predetermined time period without performing any procedure. The staple fiber components out of the second inorganic fibers that have not been agglomerated upon addition of the flocculant (i.e. free second inorganic fibers), and the binder preferentially show a tendency of precipitating while the needle mat and the sheet-forming slurry are allowed to stand for a predetermined time. As a result, the staple fiber components and the binder accumulate on the needle mat, and some of them move into the needle mat. The free staple fiber components and the binder are considered to cause the localization of the staple fibers and a higher concentration of the binder in the interface area.

The standing time may be any time period as long as it is long enough to allow the free staple fiber components and the binder to precipitate but short enough to avoid the second inorganic fibers and the binder that are agglomerated to precipitate. For example, the standing time may be from about 10 seconds to about 60 seconds.

(5) Dehydration Process

Next, moisture is removed from the sheet-forming slurry.

The dehydration can be performed through the filtration mesh by using an aspiration apparatus or the like. In the dehydration process, moisture in the sheet-forming slurry is discharged outside through the needle mat and the filtration mesh. At this time, the free staple fiber components and the binder further tend to move into the needle mat, and spread over the predetermined range from the upper surface of the needle mat, that is, spread the entire interface area.

In the dehydration process, the staple fibers that have accumulated on the needle mat and the some staple fibers that have moved into the needle mat in the standing process tend to become oriented to a direction parallel to a moving direction of the water to be removed. Namely, the staple fibers in the interface area tend to become oriented across the interface through the dehydration process.

Through the dehydration process, a layer of the sheet-processed mat precursor is formed on the needle mat to form a two-layer structure in which the staple fibers and the binder are localized in the interface area.

(6) Drying Process

Finally, the dehydrated mat having the two-layer structure is taken out from the forming device, and dried by heating at a temperature of about 100° C. to about 200° C. under an increased pressure of about 30 kPa to about 200 kPa to obtain the holding sealing material of the present embodiment.

Subsequently, the method for manufacturing an exhaust gas purifying apparatus is described with reference to the figure.

Figure 5:
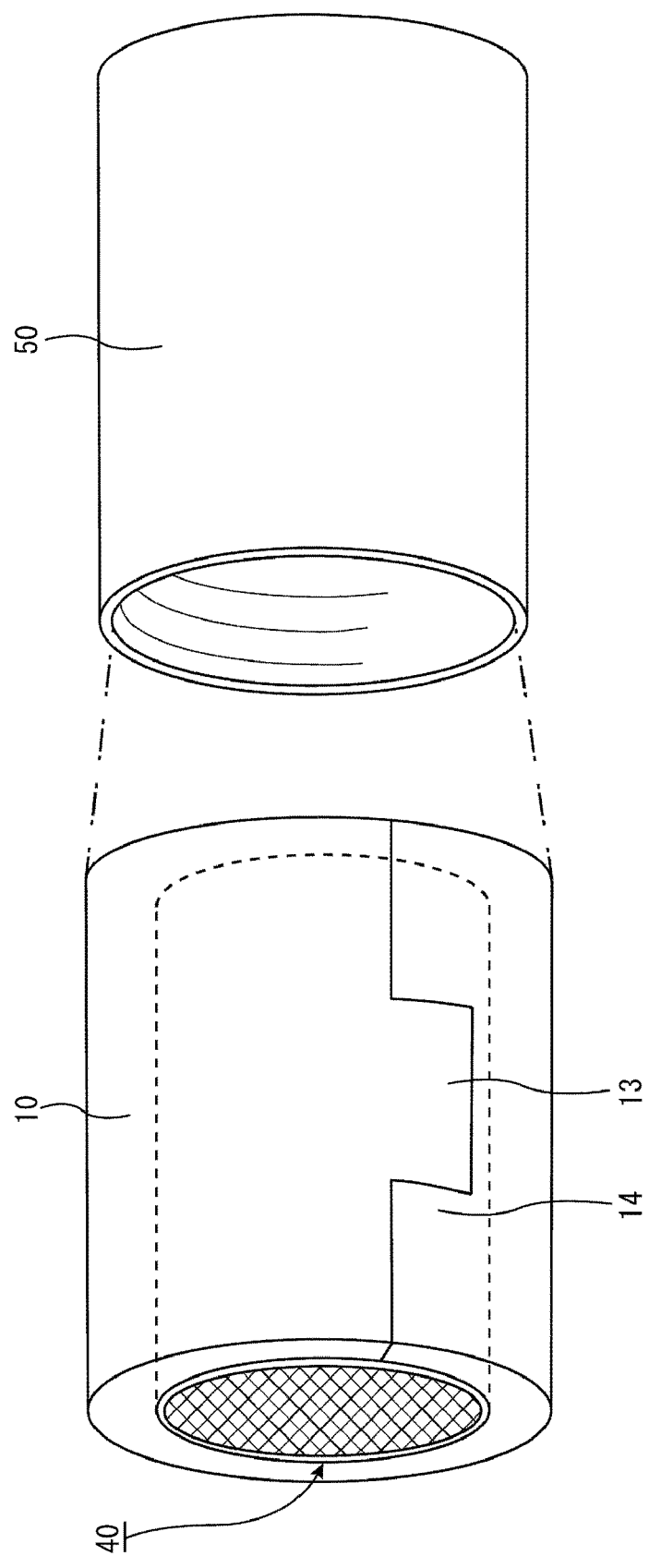
FIG. 5 is a perspective view schematically illustrating procedure of manufacturing the exhaust gas purifying apparatus of the first embodiment.

FIG. 5 is a perspective view schematically illustrating the procedure of manufacturing the exhaust gas purifying apparatus of the present embodiment.

The holding sealing material 10 manufactured through the above-described processes is wound around a periphery of a substantially round-pillar shaped honeycomb filter (exhaust gas treating body) 40 manufactured by a conventionally known method, so that a projected portion 13 and a recessed portion 14 fit together. As shown in FIG. 5, an exhaust gas purifying apparatus is manufactured by press-fitting the honeycomb filter 40 with the holding sealing material 10 wound thereon into a substantially cylindrical casing 30 mainly made of a metal or the like with a predetermined size.

The casing 50 has an inside diameter that is slightly smaller than the outermost diameter of the honeycomb filter 40 including the thickness of the holding sealing material wound around the honeycomb filter 40 so that the holding sealing material becomes compressed and allowed to exert a predetermined repulsive force (i.e. force for holding the honeycomb filter) after being press-fitted into the casing 50.

The holding sealing material of the present embodiment has an improved shear strength owing to the bond between the staple fibers and binder in the interface area. Therefore, peeling, separation and the like is less likely to occur in the holding sealing material when the exhaust gas treating body is press-fitted into the casing.

The following description will summarize the functions and effects of the holding sealing material and the exhaust gas purifying apparatus of the present embodiment.

(1) Since the predetermined staple fibers are localized in the interface area in the needle mat, it may be easier to improve the shear strength of the holding sealing material of the present embodiment compared to a case where the mats are laminated only with the binder. Thereby, it may be easier to prevent peeling and the like in the holding sealing material caused by the shear stress loaded upon the press-fitting.

(2) Since the binder content of the interface area is higher than the binder content of the needle mat in terms of weight ratio, the staple fibers and the larger amount of the binder are likely to be more firmly bound or entangled with each other in the holding sealing material of the present embodiment. Therefore, it may be easier to further improve the shear strength of the holding sealing material of the present embodiment.

(3) The holding sealing material of the present embodiment includes the needle mat and the sheet-processed mat being laminated together. Since the needle mat includes the mat of the entangled first inorganic fibers, the needle mat itself has a property to maintain its shape to a certain degree. Therefore, the needle mat does not need a large amount of the binder to maintain its shape, and needs only a minimum amount of the binder determined based on handleability and the like. Accordingly, it may be easier to form the holding sealing material using a reduced amount of the binder.

(4) In addition, the higher flexibility of the needle mat than that of the sheet-processed mat is likely to allow the needle mat to tightly fit the periphery of the exhaust gas treating body when the holding sealing material is wound around the exhaust gas treating body. Therefore, the holding sealing material of the present embodiment tends to have an excellent winding ability that allows the holding sealing material to be favorably wound around the exhaust gas treating body.

(5) Since the localized staple fibers are oriented across the interface in the holding sealing material of the present embodiment, it may be easier to further improve the shear strength of the holding sealing material.

(6) In the method for manufacturing a holding sealing material of the present embodiment, since the method includes supplying the sheet-forming slurry containing at least the second inorganic fibers and the binder on the needle mat with the binder adhered thereto, and then allowing the sheet-forming slurry and the needle mat to stand for a predetermined time, free binders which are not agglomerated and tiny staple fibers in the sheet-forming slurry tend to precipitate on the needle mat. Thereafter, the slurry is dehydrated so that the staple fibers and the binder penetrate further into a certain depth of the needle mat. As a result, it may be easier to efficiently manufacture a holding sealing material which tends to contain the staple fibers being localized and a large amount of the binder in the interface area.

(7) It may be easier to allow required amounts of the staple fibers and the binder to precipitate and to suitably manufacture the holding sealing material according to the embodiments of the present invention without sacrificing manufacturing efficiency by setting the standing time to about 10 seconds to about 60 seconds in the method for manufacturing a holding sealing material of the present embodiment.

(8) Peeling and the like is less likely to occur in the holding sealing material upon press-fitting the exhaust gas treating body with the holding sealing material wound thereon into the casing because the holding sealing material having a high shear strength is used in the exhaust gas purifying apparatus of the present embodiment. Therefore, the exhaust gas purifying apparatus is likely to be smoothly assembled. In the case where a fracture or a crack occurs in the holding sealing material, exhaust gases are likely to leak therefrom. Since the holding sealing material having an excellent winding ability is used in the exhaust gas purifying apparatus of the present embodiment, it may be easier to prevent fracture and crack formation in the holding sealing material, which may in turn tend to prevent leakage of exhaust gases from the exhaust gas purifying apparatus.

Hereinafter, an example that discloses the first embodiment of the present invention more specifically is shown, but the present invention is not limited to this example.

EXAMPLE 1

(1) Formation of Needle Mat

A base mat having a composition ratio of $Al_2O_3:SiO_2=72:28$ was prepared as a base mat made of alumina fibers having an alumina-silica composition. The needling treatment was carried out on the base mat to form a needled mat having a bulk density of $0.15$ g/cm$^3$ and a basis weight of $1050$ g/m$^2$.

An acrylic latex emulsion containing acrylic latex dispersed in water was prepared separately, and was used as a binder.

Next, the needled mat was cut into a size of $930 \times 515$ mm in a plane view. The binder was uniformly sprayed using a spray to the cut-out needled mat so that the needled mat contains 3.0% by weight of the binder with respect to the amount of the alumina fibers.

Thereafter, the needled mat with the binder adhered thereto was dried for 5 minutes at a temperature of 140° C. under ventilation and an increased pressure of 70 kPa.

(2) Formation and Lamination of Sheet-Processed Mat

First, a sheet-forming slurry was prepared as follows.

Raw material fibers including alumina fibers with a composition ratio of $Al_2O_3:SiO_2=72:28$ were prepared and 2 kg of the raw material fibers were spread for 10 minutes by a feather mill. The content of staple fibers having a fiber length of 300 μm or less in the raw material fibers thus spread was 22%.

Subsequently, 790 g of the spread raw material fibers were added to 79000 g of water and stirred for 5 minutes by a stirrer to prepare a mixture of the raw material fibers.

To the mixture of the raw material fibers, a latex was added as an organic binder to obtain a mixture containing 24% by weight of the latex, and the mixture was stirred for 1 minute. Subsequently, 6.32 g of an alumina sol was added as an inorganic binder to the mixture and stirred for another 1 minute. An amount of 3.95 g of a flocculent PERCOL 292 (manufactured by Ciba Specialty Chemicals) was added to a mixture, and stirred for 1 minute to prepare a sheet-forming slurry.

Next, the sheet-processed mat was manufactured using the sheet-forming slurry.

A filtration mesh (30 meshes) was set at the bottom of a forming device for sheet-forming (930 mm in length×515 mm in width×400 mm in depth), and the above-mentioned needle mat was placed on the filtration mesh.

Next, the sheet-forming slurry was supplied from above the needle mat. Thereafter, the supplied sheet-forming slurry was allowed to stand for 20 seconds without performing any operation.

After being allowed to stand, the sheet-forming slurry was dehydrated to form a layer of the sheet-processed mat on the needle mat. The dehydration treatment was carried out as follows: applying a suction pressure from the bottom side of the forming device for sheet-forming using a suction pump; and forcibly sucking water in the sheet-forming slurry through the filtration mesh.

At the last, the mat having the two-layer structure formed by the needle mat and the sheet-processed mat was taken out from the forming device for sheet-forming, and dried at a temperature of 135° C. for 60 minutes while being compressed to 9 mm thickness. Thus a holding sealing material including the needle mat and the sheet-processed mat integrated together was manufactured. The sheet-processed mat had a basis weight of 1650 g/m$^2$.

EXAMPLES 2 TO 10

A holding sealing materials was manufactured by following the same procedure as in Example 1, except that the amount of the binder to be adhered to the needle mat and the binder content of the sheet-forming slurry were changed as shown in Table 1.

COMPARATIVE EXAMPLES 1 AND 2

A holding sealing material without staple fibers contained in the interface area was manufactured in each of Comparative Examples 1 and 2. First, a needle mat was formed and a sheet-forming slurry was prepared by following the same procedure as in Example 1. Thereafter, using the sheet-forming slurry, a sheet-processed mat was formed and laminated as follows.

A filtration mesh (30 meshes) was set at the bottom of a forming device for sheet-forming (930 mm in length×515 mm in width×400 mm in depth), and the sheet-forming slurry was supplied on the filtration mesh.

The supplied sheet-forming slurry was dehydrated to form a layer of the sheet-processed mat. The dehydration treatment was carried out as follows: applying a suction pressure from the bottom side of the forming device for sheet-forming using a suction pump; and forcibly sucking water in the sheet-forming slurry through the filtration mesh.

Subsequently, the sheet-processed mat layer was taken out from the forming device for sheet-forming, and dried at a temperature of 150° C. for 13 minutes while being compressed to 5.5 mm thickness. The sheet-processed mat thus obtained had a basis weight of 1650 g/m$^2$.

Next, the needle mat manufactured in advance and the sheet-processed mat were laminated by bonding each other with a binder. An acrylic latex of an organic binder was used as the binder, and the applied amount of the binder was adjusted to give the values shown in Table 1 with respect to the weight of the needle mat.

Thereafter, the sheet-processed mat was placed on the needle mat, and dried at a temperature of 150° C. for 10 minutes while being compressed to 9 mm thickness. A holding sealing material in which the needle mat and the sheet-processed mat were laminated together and the interface area contains no staple fibers was manufactured through the above-mentioned processes.

COMPARATIVE EXAMPLE 3

A holding sealing material having a two-layer structure of sheet-processed mats with no needle mat was manufactured in Comparative Example 3.

A filtration mesh (30 meshes) was set at the bottom of a forming device for sheet-forming (930 mm in length×515 mm in width×400 mm in depth), and a sheet-forming slurry prepared by following the same procedure as in Example 1 was supplied on the filtration mesh.

The supplied sheet-forming slurry was dehydrated to form a layer of the sheet-processed mat. The dehydration treatment was carried out as follows: applying a suction pressure from the bottom side of the forming device for sheet-forming using a suction pump; and forcibly sucking water in the sheet-forming slurry through the filtration mesh.

Thereafter, the sheet-processed mat layer was taken out from a forming device for sheet-forming, and dried at a temperature of 150° C. for 13 minutes while being compressed to 3.5 mm thickness. The sheet-processed mat thus obtained had a basis weight of 1050 g/m².

Next, the filtration mesh (30 meshes) was again set at the bottom of the forming device for sheet-forming (930 mm in length×515 mm in width×400 mm in depth), and the abovementioned sheet-processed mat was placed on the filtration mesh.

Next, the sheet-forming slurry was supplied from above the needle mat. Thereafter, the supplied sheet-forming slurry was allowed to stand for 20 seconds without performing any operation.

After being allowed to stand, the sheet-forming slurry was dehydrated to form another layer of the sheet-processed mat on the sheet-processed mat. The dehydration treatment was carried out as follows: applying a suction pressure from the bottom side of the forming device for sheet-forming using a suction pump; and forcibly sucking water in the sheet-forming slurry through the filtration mesh.

At the last, the mat having the two-layer structure formed by the sheet-processed mat and the sheet-processed mat was taken out from the forming device for sheet-forming, and dried at a temperature of 135° C. for 60 minutes while being compressed to 9 mm thickness. Thus, a holding sealing material in which the two layers of the sheet-processed mats were integrated was manufactured.

Shear strength measurement, initial density measurement, friction coefficient measurement, ignition loss measurement, fiber length measurement and a winding ability check test were performed on each of the holding sealing materials manufactured in Examples 1 to 10 and Comparative Examples 1 to 3.

(Shear Strength Measurement)

Figure 6:
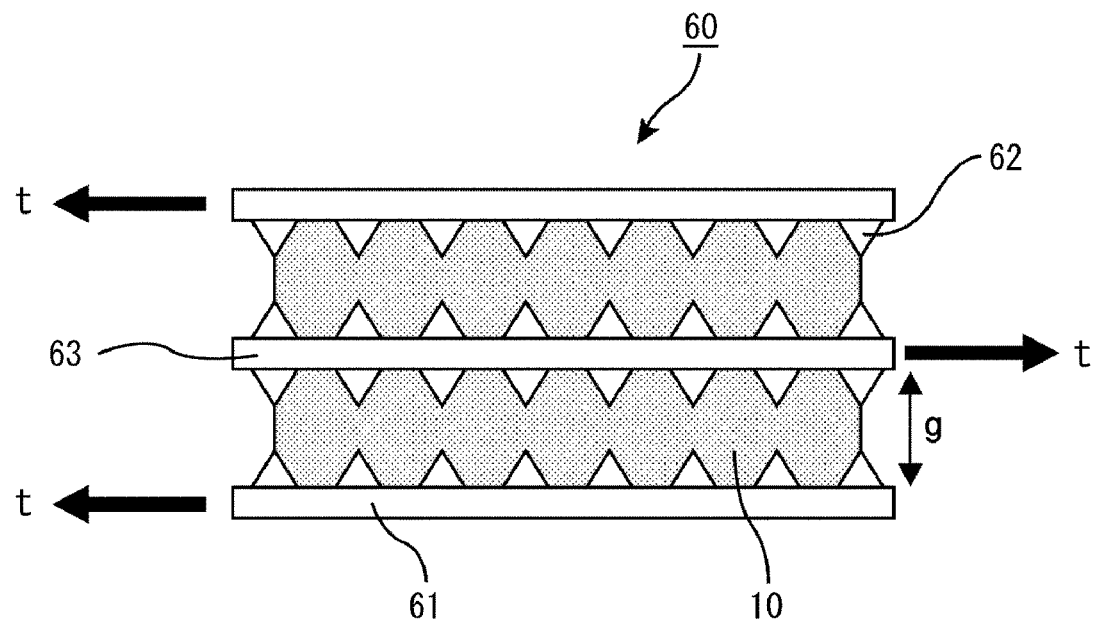
FIG. 6 is a side view schematically illustrating a shear strength test apparatus.

The shear strength was measured by using a shear strength test apparatus shown in FIG. 6. FIG. 6 is a side view schematically illustrating the shear strength test apparatus.

First, the manufactured holding sealing material was punched out to obtain samples for the shear strength measurement each having a size of 50×50 mm in a plane view. The punched out sample 10 for the measurement was placed on a SUS plate 61 having projections 62. A SUS intermediate plate 63 having projections 62 on both sides thereof was placed on the measurement sample 10 so that the measurement sample 10 was sandwiched in a predetermined gap g. Next, another punched out measurement sample 10 was placed on the intermediate plate 63, and another SUS plate 61 having projections 62 was placed on this measurement sample 10 to form a predetermined gap g. Thus, in total, two measurement samples were sandwiched by the three plates, that is, one in each gap.

Subsequently, the upper and lower plates 61, and the intermediate plate 63 were pulled in the opposite direction (directions of arrows t in FIG. 6), respectively, and a stress (N) loaded at the time was measured. The measured stress was divided by the total area (0.05 m²×2) of the two sheets, and the obtained value was evaluated as a stress (kPa) loaded per unit area (i.e. shear strength).

(Initial Density Measurement)

The manufactured holding sealing material was punched out to obtain a sample for the initial density measurement having a size of 100 mm×100 mm in a plane view. The thickness (mm) and the weight (g) of the sample were measured to calculate the initial density (g/cm³).

(Friction Coefficient Measurement)

The manufactured holding sealing material was punched out to obtain a sample for the friction coefficient measurement having a size of 30×50 mm in a plane view. On a SUS plate fixed to a measurement base, the measurement sample was placed longitudinally parallel to a direction to be pulled by a weight piece. Additionally, a 5 kg weight piece was placed on the measurement sample, and tensile stresses generated when the weight piece was pulled horizontally at a speed of 10 mm/min were measured. The maximum value of the measured stresses (maximum stress (N)) was selected and divided by the load (N) determined based on the weight of the weight piece to calculate a static friction coefficient.

(Ignition Loss Measurement)

The manufactured holding sealing material was punched out to obtain a sample for the ignition loss measurement having a size of 50×50 mm in a plane view. The sample was divided into the following areas: an area (a) occupied by the sheet-processed mat (corresponding to the area B in FIG. 2); an area (b) occupied by the interface area (corresponding to the interface area 21 in FIG. 2); and an area (c) occupied by the needle mat except the interface area (b).

Subsequently, each divided area was used as a sample, and put into a crucible separately. The weight of the crucible was measured in advance. The total weight of the crucible and the sample was measured. The crucible with the sample included therein was charged in an electric furnace, and heated and fired at a temperature of 600° C. for 1 hour. After cooling, the crucible was taken out from the electric furnace, and the weight of the crucible was measured again to determine the ignition loss (g) by comparing the weights before and after the ignition. The binder contents (% by weight) of the needle mat and the sheet-processed mat were determined, respectively, based on the ignition loss thus determined.

(Fiber Length Measurement)

The holding sealing materials manufactured in Example 1 and Comparative Example 1 were punched out to obtain samples for the fiber length measurement each having a size of 10 mm×10 mm in a plane view. Each sample was divided into an area (a) occupied by the sheet-processed mat, an area (b) occupied by the interface area, and an area (c) occupied by the needle mat except the interface area (b), as in the ignition loss measurement.

In each area, 10 measurement points were determined at random, and a fiber sample was obtained from each point. The fiber length was measured for at least 50 fibers in each fiber sample by using an optical microscope at a magnification of ×10 times. Subsequently, the numbers of staple fibers having a fiber length of 300 μm or less were determined based on the measurement results of the respective areas (a) to (c). The staple fibers existence ratio (%) was calculated by dividing the number of the staple fibers by the total number of the fibers whose fiber length had been measured.

(Winding Ability Check Test)

A round pillar-shaped honeycomb catalyst carrier having a diameter of 127 mm and a longitudinal length of 150 mm was prepared. A sample for winding having a size of 350 mm×100 mm in a plane view was cut out from each of the holding sealing materials manufactured in Examples and Comparative Examples. The sample for winding was wound around the periphery of the catalyst carrier with the needle mat facing outside. The check test was performed according to a criterion whether a crack had occurred in the appearance of the holding sealing material.

Table 1 and 2 show the results.

the interface area. In addition, all the shear strengths measured in Examples were more than 60 kPa, and high enough to prevent peeling and the like in the holding sealing material upon the press-fitting into the casing.

As shown in Table 2, the staple fiber existence ratios in the respective areas of the holding sealing material of Example 1 were 27% in the area (a), 56% in the area (b), and 19% in the

TABLE 1

|  | Area (a) | | Area (b) + (c) | | | | |
| --- | --- | --- | --- | --- | --- | --- | --- |
|  | Supplied amount of binder (wt %, with respect to fibers) | Binder content (wt %) | Supplied amount of binder (wt %, with respect to fibers) | Binder content (wt %) | Area (a) + (b) + (c) Binder content (wt %) | Area (b) Binder content (wt %) | Ratio of area (b) to area (b) + (c) (b)/(b) + (c) |
| Example 1 | 24.0 | 17.2 | 3.0 | 4.3 | 12.2 | 16.4 | 3.8 |
| Example 2 | 6.0 | 5.6 | 3.0 | 3.7 | 4.8 | 8.2 | 2.3 |
| Example 3 | 6.0 | 5.0 | 1.0 | 1.2 | 3.5 | 2.9 | 2.4 |
| Example 4 | 3.0 | 2.3 | 3.0 | 3.6 | 2.8 | 13.7 | 3.8 |
| Example 5 | 1.5 | 1.6 | 3.0 | 3.6 | 2.4 | 8.6 | 2.4 |
| Example 6 | 6.0 | 5.3 | 4.0 | 4.8 | 5.1 | 10.8 | 2.2 |
| Example 7 | 6.0 | 5.5 | 6.0 | 6.5 | 5.9 | 9.9 | 1.5 |
| Example 8 | 3.0 | 2.5 | 6.0 | 6.6 | 4.1 | 8.9 | 1.3 |
| Example 9 | 1.5 | 1.8 | 6.0 | 6.3 | 3.5 | 8.6 | 1.4 |
| Example 10 | 24.0 | 18.1 | 1.0 | 2.1 | 11.9 | 14.2 | 6.6 |
| Comparative Example 1 | 6.0 | 5.4 | 3.0 | 4.3 | 5.0 | 29.9 | 7.0 |
| Comparative Example 2 | 6.0 | 5.4 | 3.0 | 3.9 | 4.8 | 40.0 | 10.2 |
| Comparative Example 3 | 6.0 | 5.4 | 6.0 | 5.2 | 5.3 | 29.9 | 5.8 |

|  | Application of binder between mats | Localization of staple fibers in interface area | Shear strength (kPa) | Crack in mat | Friction coefficient (—) | Initial density (g/cm$^3$) |
| --- | --- | --- | --- | --- | --- | --- |
| Example 1 | Not applied | Localized | 88.6 | None | 0.28 | 0.21 |
| Example 2 | Not applied | Localized | 84.7 | None | 0.29 | 0.18 |
| Example 3 | Not applied | Localized | 60.8 | None | 0.26 | 0.18 |
| Example 4 | Not applied | Localized | 73.8 | None | 0.29 | 0.16 |
| Example 5 | Not applied | Localized | 74.1 | None | 0.29 | 0.15 |
| Example 6 | Not applied | Localized | 71.2 | None | 0.33 | 0.19 |
| Example 7 | Not applied | Localized | 88.6 | None | 0.37 | 0.19 |
| Example 8 | Not applied | Localized | 89.6 | None | 0.36 | 0.19 |
| Example 9 | Not applied | Localized | 84.3 | None | 0.36 | 0.18 |
| Example 10 | Not applied | Localized | 68.8 | None | 0.27 | 0.21 |
| Comparative Example 1 | Applied 25% | Not localized | 45.2 | None | 0.28 | 0.19 |
| Comparative Example 2 | Applied 50% | Not localized | 48.7 | None | 0.29 | 0.20 |
| Comparative Example 3 | Not applied | Localized | 83.6 | Observed | 0.28 | 0.19 |

TABLE 2

|  | Example 1 | Comparative Example 1 |
| --- | --- | --- |
| Area (a) | 27% | 29% |
| Area (b) | 56% | 22% |
| Area (c) | 19% | 17% |

Each of the holding sealing materials manufactured in Examples 1 to 10 had a higher binder content of the area (b) corresponding to the interface area than the binder content of the combined area of the area (b) and the area (c) corresponding to the entire needle mat. Moreover, the staple fibers having a fiber length of 300 μm or less were observed localized in area (c). According to the results, the staple fibers were regarded to be localized in the area (b) corresponding to the interface area. On the contrary, in the holding sealing material of Comparative Example 1, the staple fiber existence ratios show a decreasing gradient in the order from the area (a) to the area (c), and the staple fibers were not determined to be localized unlike Example 1 in which the staple fibers were determined to be localized.

Figure 7:
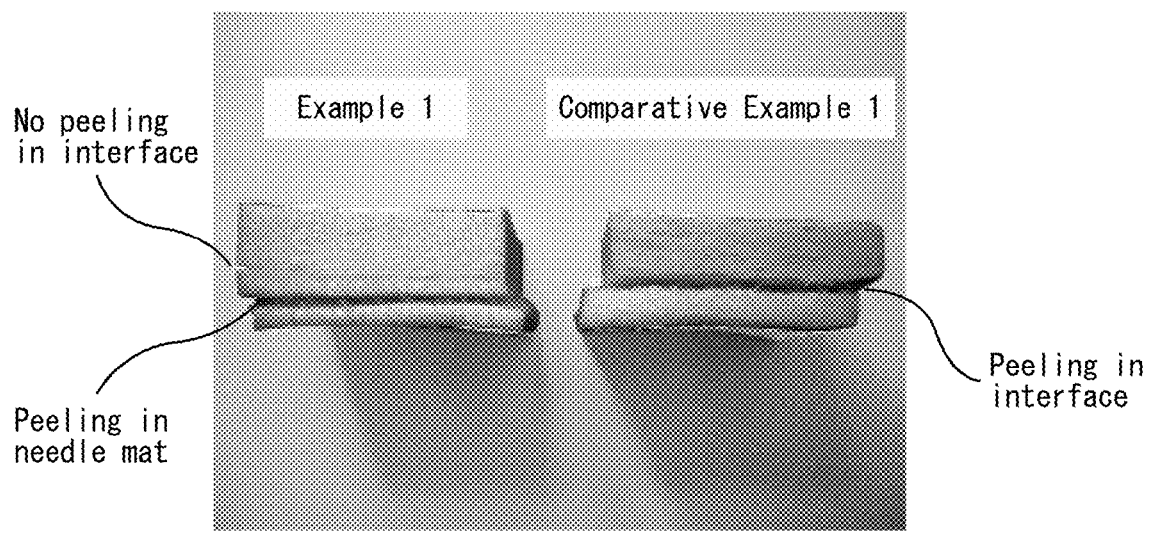
FIG. 7 is a photograph of measurement samples of holding sealing materials of Example 1 and Comparative Example 1 taken after shear strength measurement.

FIG. 7 is a photograph of the measurement samples of the holding sealing materials of Example 1 and Comparative Example 1 taken after the measurement of the shear strength. As shown in FIG. 7, in the holding sealing material of Example 1, a peeling occurred in the needle mat, and no peeling occurred in the interface between the needle mat and the sheet-processed mat. These results reveal that the holding sealing material of Example 1 presumably has a shear strength high enough to prevent the needle mat and the sheet-processed mat from separating from each other. In contrast, a peeling occurred in the interface due to a low shear strength in the holding sealing material of Comparative Example 1.

The reason for the high shear strengths of the holding sealing materials of Examples 1 to 10 may be attributed to the anchoring effect produced by the firm bond between the staple fibers localizing in the interface area and the larger amount of the binder in the interface area than that in the needle mat.

In contrast, both holding sealing materials manufactured in Comparative Examples 1 and 2 had a low shear strength. The reason for this may be explained as follows. Each of the holding sealing materials of Comparative Examples 1 and 2 was manufactured without performing the standing process in which the sheet-forming slurry was supplied on the needle mat, and left standing for a predetermined time. Instead, the needle mat and the sheet-processed mat were separately manufactured and adhered to each other with the organic binder. Thereby, the staple fibers were less likely to be localized in the interface area, which may in turn lead to a low shear strength.

With respect to the winding ability, each of the holding sealing materials of Examples 1 to 10 had an excellent winding ability without crack formation. This may be explained as follows. The holding sealing materials of the present Examples were flexible because each of the holding sealing materials were formed by the needle mat and the sheet-processed mat. Therefore, the needle mat is presumably likely to tightly fit the periphery of the round pillar-shaped catalyst carrier when the holding sealing material was wound around the catalyst carrier with the needle mat facing outside. In contrast, the holding sealing material of Comparative Example 3 had a high shear strength, but had cracks. This may be explained as follows. The holding sealing material of Comparative Example 3 had higher shear strength than those of Comparative Examples 1 and 2 because the staple fibers became localized in the interface area by carrying out the predetermined standing process. However, the holding sealing material of Comparative Example 3 had the two-layer structure formed by the two sheet-processed mats, and thus had a poor flexibility, so that the holding sealing material was presumably less likely to tightly fit the periphery of the round pillar-shaped catalyst carrier upon being wound around the catalyst carrier.

Figure 8A:
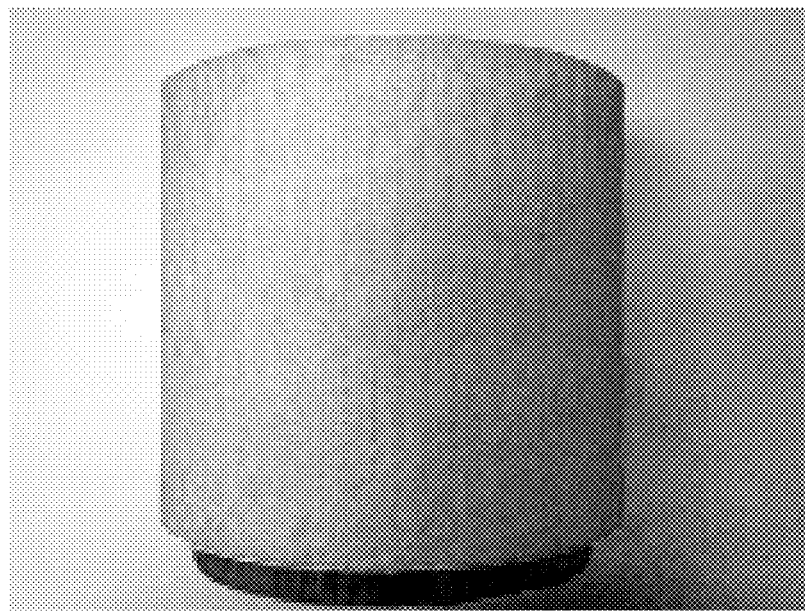
FIG. 8A is a photograph of a test sample of a holding sealing material of Example 2 taken after a winding ability check test.
Figure 8B:
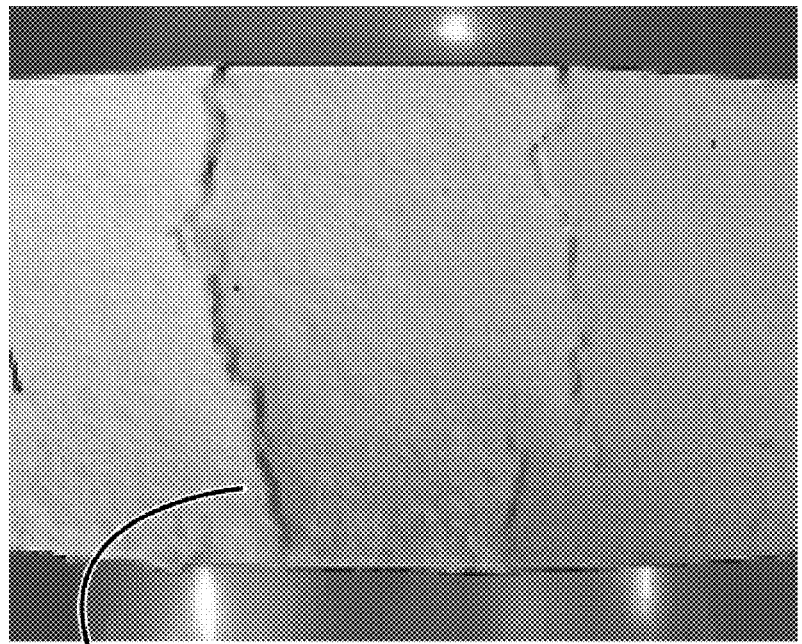
FIG. 8B is a photograph of a test sample of a holding sealing material of Comparative Example 3 taken after the winding ability check test.

FIG. 8A and FIG. 8B are photographs of the test samples of the holding sealing materials of Example 3 and Comparative Example 3 taken after the winding ability check test. The holding sealing material of Example 3 shown in FIG. 8A had no cracks, and was excellently wound around the catalyst carrier. However, the holding sealing material of Comparative Example 3 shown in FIG. 8B had two large cracks, and thus presumably had flexibility insufficient to resist the stress loaded upon being wound.

With respect to the friction coefficient, all the holding sealing materials of Examples 1 to 10 had a friction coefficient that allows smooth press-fitting into the casing. Out of these, Example 7 to 9 in which the binder content of the needle mat exceeded about 6% by weight had a slightly higher friction coefficient than those of other Examples. This may be because the friction coefficient increases with an increase in the binder content of the needle mat. Therefore, although even a holding sealing material in which the binder content of the needle mat is more than about 6% by weight can be adequately used as a product, the specifically desirable binder content of the needle mat was presumably about 5% by weight or less.

However, a holding sealing material having a higher binder content of the needle mat had a tendency to have a higher shear strength. Based on this fact, in order to increase the shear strength, the binder content of the needle mat is presumably desired to be higher. The shear strength of the holding sealing material of Example 3 whose binder content of the needle mat was less than about 2% by weight was enough for a practical use, but slightly lower than the shear strengths of the holding sealing materials of other Examples. For these reasons, the desirable binder content of the needle mat is presumably about 2% by weight or more considering the shear strength, and about 5% by weight or less considering the friction coefficient. The reason for this is not certain but may mainly be that the larger amount of the binder contained in the entire needle mat was likely to enhance the anchoring effect produced by three components of the staple fibers localized in the interface area, the larger amount of the binder in the interface area, and the inorganic fibers forming the needle mat.

Although the initial density of the holding sealing material is not particularly limited as long as it does not cause any problems in, for example, handling of the holding sealing material, the initial density is listed as an evaluation item. This is because a holding sealing material having a high bulk density as a whole is desirable considering the press-fitability. Namely, a holding sealing material having a volume reduced in advance to a certain degree is allowed to exert an improved press-fitability, compared to a holding sealing material having an original volume. When the results of Examples are considered from this viewpoint, in order to obtain an initial density of about 0.16 g/cm$^3$ that is required to obtain an excellent press-fitability, the desirable binder content of the entire holding sealing material (the areas (a) to (c)) is presumably about 3.0% by weight or more. Although the upper limit of the binder content is also not particularly limited, a desirable upper limit is presumably about 13% by weight or less, considering that a binder content of more than about 13% by weight does not influence the initial density so much, and gas components derived from the binder generated upon burning of the binder are needed to be controlled at a low level.

Second Embodiment

Next, a second embodiment that is one embodiment of the holding sealing material and the method for manufacturing a holding sealing material of the present invention will be described.

In the holding sealing material according to the second embodiment, the binder content of the needle mat is lower than the binder content of the sheet-processed mat in terms of weight ratio.

The respective amounts of the binder in the needle mat and the sheet-processed mat are not particularly limited in the holding sealing material according to the first embodiment. The holding sealing material according to the second embodiment has a low friction coefficient owing to a smaller binder content of the needle mat than the binder content of the sheet-processed mat in terms of weight ratio. When an exhaust gas purifying apparatus is assembled by using the holding sealing material, it may be easier to reduce the frictional resistance generated upon the press-fitting of the exhaust gas treating body into the casing by winding the holding sealing material around the exhaust gas treating body with the needle mat facing outside.

In order to obtain the needle mat containing a smaller amount of the binder than an amount of the binder contained in the sheet-processed mat in terms of weight ratio, the sheet-forming slurry needs to contain a larger amount of the binder than an amount of the binder to be adhered to the needle mat.

The holding sealing material of the second embodiment can also exert the same effects as those of (1) to (8) of the first embodiment.

(9) Moreover, upon manufacturing an exhaust gas purifying apparatus by using the holding sealing material of the second embodiment, the exhaust gas treating body is likely to be smoothly press-fitted into the casing when the holding sealing material of the second embodiment is wound around the exhaust gas treating body with the needle mat having a lower binder content facing outside (casing side), that is, the holding sealing material is wound with its face having a low friction coefficient facing the casing side.

Other Embodiments

The shapes of the recessed portion and the projected portion each of which is formed on a shorter side of the holding sealing material according to the embodiments of the present invention are not particularly limited as long as the shapes enable the recessed portion and the projected portion to be fitted to each other. In the case where one set of a recessed portion and a projected portion is formed, desirably, the projected portion that projects over a size from about 20 mm in width×about 20 mm in length to about 100 mm in width× about 100 in length is formed on one portion of the shorter side on one side, and the recessed portion that is fitted to the projected portion is formed on one portion of the shorter side on the other side. In the case where an exhaust gas purifying apparatus is manufactured using the holding sealing material having such shapes of the recessed portion and the projected portion, the exhaust gas treating body is likely to be surely held by the holding sealing material, leading to excellent handleability.

In addition, a plurality of recessed portions and projected portions that are fitted to each other may be formed in the shorter sides of the holding sealing material, or recessed portions and projected portions may not be formed therein.

In the holding sealing material according to the embodiments of the present invention, the average fiber length of the first inorganic fibers is desirably from about 0.5 cm to about 10 cm, and more desirably from about 1 cm to about 8 cm.

The average fiber length of the second inorganic fibers is desirably from about 0.2 mm to about 20 mm, and more desirably from about 0.4 mm to about 16 mm.

In the holding sealing material according to the embodiments of the present invention, the average fiber diameter of the first inorganic fibers is desirably from about 1 μm to about 20 μm, and more desirably from about 3 μm to about 10 μm.

The average fiber diameter of the second inorganic fibers is desirably from about 1 μm to about 20 μm, and more desirably from about 3 μm to about 10 μm.

The amount of the binder contained in the holding sealing material according to the embodiments of the present invention is desirably from about 0.5% by weight to about 15% by weight, more desirably from about 1% by weight to about 14% by weight, and further more desirably from about 3% by weight to about 12% by weight. When the amount of an organic binder is about 0.5% by weight or more, since the bulk density of the holding sealing material is less likely to be low, the holding sealing material is less likely to have a reduced press-fitability into the casing. In addition, when the amount of the binder is about 15% by weight or less, since, upon use of an exhaust gas purifying apparatus, the amount of organic components in exhaust gases to be discharged is less likely to increase, a higher load is less likely to be applied to the environment.

Although not particularly limited, the basis weight of the holding sealing material according to the embodiments of the present invention is desirably from about 1000 $g/m^2$ to about 5000 $g/m^2$, and more desirably from about 1500 $g/m^2$ to about 4000 $g/m^2$. Although not particularly limited, the bulk density thereof is desirably from about 0.10 $g/cm^3$ to about 0.30 $g/cm^3$.

Although not particularly limited, the thickness of the holding sealing material according to the embodiments of the present invention is desirably from about 6 mm to about 20 mm.

The organic binder used for manufacturing the holding sealing material according to the embodiments of the present invention is not limited to the acrylic-based resin, and examples thereof include: rubbers such as acrylic rubber; water-soluble organic polymers such as carboxymethyl cellulose or polyvinyl alcohol; thermoplastic resins such as styrene resin; thermosetting resins such as epoxy resin; and the like. Particularly preferred among these are acrylic rubber, acrylonitrile-butadiene rubber, and styrene-butadiene rubber.

The emulsion may include plural kinds of the above-mentioned organic binders.

Examples of the emulsion include: a latex in which the above-mentioned organic binder is dispersed in water; a solution in which the above-mentioned organic binder is dissolved in water or an organic solvent; and the like.

The thicknesses of the needle mat and the sheet-processed mat of the holding sealing material according to the embodiments of the present invention may be almost the same, or a ratio of the thickness of the needle mat to the thickness of the sheet-processed mat may be from about (3:1) to about (1:10).

When the ratio of the thickness of the needle mat is from about (3:1) to about (1:10), the holding sealing material is less likely to have a reduced flexibility. In addition, when the ratio of the thickness of the needle mat is from about (3:1) to about (1:10), the amount of the sheet-forming slurry used for forming the sheet-processed mat is less likely to decrease, and the amounts of the staple fibers or the binder in the interface area are likely to achieve the predetermined values.

The inorganic binder to be used for manufacturing the holding sealing material according to the embodiments of the present invention is not limited to the alumina sol, and examples thereof include silica sol and the like.

Although the material for the casing forming one component of the exhaust gas purifying apparatus according to the embodiments of the present invention is not particularly limited as long as it is a heat-resistant metal, and examples thereof include metals, such as stainless steel, aluminum and iron.

Additionally, in the case where an exhaust gas purifying apparatus is manufactured by using a substantially cylindrical casing, what is called a sizing system may be used to manufacture the exhaust gas purifying apparatus, in which, after an exhaust gas treating body, with a holding sealing material being wound around, has been inserted into a casing having an inner diameter larger than the total combined length of the diameter of the end face of the exhaust gas treating body and the thickness of the holding sealing material that has been wound around the exhaust gas treating body, the casing is compressed from the peripheral side by a pressing machine or the like.

The exhaust gas treating body forming one component of the exhaust gas purifying apparatus according to the embodiments of the present invention may be prepared as an integral exhaust gas treating body configured by one sintered body as a whole, shown in FIG. 4(a), or may be prepared as an aggregated exhaust gas treating body obtained by using adhesive layers and combining a plurality of honeycomb fired bodies, each having a structure in which a large number of cells are longitudinally disposed in parallel with one another, with a cell wall being interposed therebetween.

The exhaust gas treating body forming one component according to the embodiments of the exhaust gas purifying apparatus of the present invention may support a catalyst. Examples of the catalyst include noble metals such as platinum, palladium, and rhodium, alkali metals such as potassium, and sodium, alkaline earth metals such as barium, or metal oxides. Each of these catalysts may be used alone, or two or more kinds of these may be used in combination.

Further, the above-described metal oxide is not particularly limited as long as it makes it easier to lower the combustion temperature of PM, and examples thereof include a composite oxide represented by $CeO_2$, $ZrO_2$, $FeO_2$, $Fe_2O_3$, CuO, $CuO_2$, $Mn_2O_3$, MnO, the composition formula $AnB1\text{-}nCO_3$ (in the formula, A is La, Nd, Sm, Eu, Gd or Y, B is an alkali metal or alkaline earth metal, and C is Mn, Co, Fe or Ni, and $0 \leq n \leq 1$) and the like.

Each of these catalysts may be used alone, or two or more kinds of these may be used in combination; however, the catalyst desirably contains at least $CeO_2$.

The combustion temperature of PM is likely to be lowered by supporting such a metal oxide.

Examples of the method for applying a catalyst to the exhaust gas treating body include: a method in which the exhaust gas treating body is impregnated with a solution containing a catalyst and then heated; a method for forming a catalyst supporting layer consisting of an alumina film on the surface of the exhaust gas treating body and applying a catalyst to the alumina film; and the like.

Examples of the method for forming the alumina film include: a method in which the exhaust gas treating body is impregnated with a solution of a metal compound containing aluminum such as $Al(NO_3)_3$ and then heated; a method in which the exhaust gas treating body is impregnated with a solution containing alumina powder and then heated; and the like.

Examples of the method for applying a catalyst to the alumina film include: a method in which the exhaust gas treating body is impregnated with a solution containing a noble metal, an alkaline metal, an alkaline earth metal, and a metal oxide, or the like, and then heated; and the like.

Obviously, numerous modifications and variations of the present invention are possible in light of the above teachings. It is therefore to be understood that within the scope of the appended claims, the invention may be practiced otherwise than as specifically described herein.

The invention claimed is:

1. A holding sealing material comprising:
   a needle mat including entangled first inorganic fibers and a binder; and
   a sheet-processed mat including a binder and second inorganic fibers processed into a sheet, said needle mat and said sheet-processed mat being laminated together,
   wherein staple fibers having an average fiber length shorter than an average fiber length of said second inorganic fibers are localized in an interface area extending inside said needle mat from an interface between said needle mat and said sheet-processed mat, and
   wherein a binder content of said interface area is higher than a binder content of said needle mat in terms of weight ratio.

2. The holding sealing material according to claim 1, wherein
said staple fibers being localized are oriented across said interface.

3. The holding sealing material according to claim 1, wherein
the binder content of said needle mat is lower than a binder content of said sheet-processed mat in terms of weight ratio.

4. The holding sealing material according to claim 1, wherein
the binder content of said interface area is from about 1.3 times to about 7.0 times larger than the binder content of said needle mat in terms of weight ratio.

5. The holding sealing material according to claim 1, wherein
the average fiber length of said staple fibers is about 300 μm or less.

6. The holding sealing material according to claim 1, wherein
said first inorganic fibers comprise at least one of alumina fibers, ceramic fibers, and silica fibers.

7. The holding sealing material according to claim 1, wherein
an average fiber length of said first inorganic fibers is from about 0.5 cm to about 10 cm.

8. The holding sealing material according to claim 1, wherein
the average fiber length of said second inorganic fibers is from about 0.2 mm to about 20 mm.

9. The holding sealing material according to claim 1, wherein
an average fiber diameter of said first inorganic fibers is from about 1 μm to about 20 μm.

10. The holding sealing material according to claim 1, wherein
an average fiber diameter of said second inorganic fibers is from about 1 μm to about 20 μm.

11. The holding sealing material according to claim 1, wherein
said holding sealing material has a basis weight of about 1000 $g/m^2$ to about 5000 $g/m^2$.

12. The holding sealing material according to claim 1, wherein
said holding sealing material has a bulk density of about 0.10 $g/cm^3$ to about 0.30 $g/cm^3$.

13. The holding sealing material according to claim 1, wherein
said holding sealing material has a thickness of about 6 mm to about 20 mm.

14. The holding sealing material according to claim 1, wherein
a ratio of a thickness of said needle mat to a thickness of said sheet-processed mat is from about (3:1) to about (1:10).

15. The holding sealing material according to claim 1, wherein
said holding sealing material contains said binder in an amount of from about 0.5% by weight to about 15% by weight.

16. The holding sealing material according to claim 1, wherein
said binder comprises at least one of an organic binder and an inorganic binder.

17. The holding sealing material according to claim 16, wherein
said organic binder comprises at least one of rubbers, water-soluble organic polymers, thermoplastic resins, and thermosetting resins.

18. The holding sealing material according to claim 16, wherein
said inorganic binder comprises at least one of alumina sol and silica sol.

19. An exhaust gas purifying apparatus comprising:
an exhaust gas treating body having a plurality of cell walls extending to define a plurality of cells;
a casing housing said exhaust gas treating body; and
a holding sealing material disposed between said exhaust gas treating body and said casing to hold said exhaust gas treating body, said holding sealing material comprising:
  a needle mat including entangled first inorganic fibers and a binder; and
  a sheet-processed mat including a binder and second inorganic fibers processed into a sheet, said needle mat and said sheet-processed mat being laminated together,
wherein staple fibers having an average fiber length shorter than an average fiber length of said second inorganic fibers are localized in an interface area extending inside said needle mat from an interface between said needle mat and said sheet-processed mat, and
wherein a binder content of said interface area is higher than a binder content of said needle mat in terms of weight ratio.

20. The exhaust gas purifying apparatus according to claim 19, wherein
said staple fibers being localized are oriented across said interface in said holding sealing material.

21. The exhaust gas purifying apparatus according to claim 19, wherein
the binder content of said needle mat is lower than a binder content of said sheet-processed mat in terms of weight ratio in said holding sealing material.

22. The exhaust gas purifying apparatus according to claim 19, wherein
the binder content of said interface area is from about 1.3 times to about 7.0 times larger than the binder content of said needle mat in terms of weight ratio in said holding sealing material.

23. The exhaust gas purifying apparatus according to claim 19, wherein
the average fiber length of said staple fibers is about 300 μm or less in said holding sealing material.

24. The exhaust gas purifying apparatus according to claim 19, wherein
said first inorganic fibers comprise at least one of alumina fibers, ceramic fibers, and silica fibers in said holding sealing material.

25. The exhaust gas purifying apparatus according to claim 19,
an average fiber length of said first inorganic fibers is from about 0.5 cm to about 10 cm in said holding sealing material.

26. The exhaust gas purifying apparatus according to claim 19, wherein
the average fiber length of said second inorganic fibers is from about 0.2 mm to about 20 mm in said holding sealing material.

27. The exhaust gas purifying apparatus according to claim 19, wherein
an average fiber diameter of said first inorganic fibers is from about 1 μm to about 20 μm in said holding sealing material.

28. The exhaust gas purifying apparatus according to claim 19, wherein
an average fiber diameter of said second inorganic fibers is from about 1 μm to about 20 μm in said holding sealing material.

29. The exhaust gas purifying apparatus according to claim 19, wherein
said holding sealing material has a basis weight of about 1000 g/m$^2$ to about 5000 g/m$^2$.

30. The exhaust gas purifying apparatus according to claim 19, wherein
said holding sealing material has a bulk density of about 0.10 g/cm$^3$ to about 0.30 g/cm$^3$.

31. The exhaust gas purifying apparatus according to claim 19, wherein
said holding sealing material has a thickness of about 6 mm to about 20 mm.

32. The exhaust gas purifying apparatus according to claim 19, wherein
a ratio of a thickness of said needle mat to a thickness of said sheet-processed mat is from about (3:1) to about (1:10) in said holding sealing material.

33. The exhaust gas purifying apparatus according to claim 19, wherein
said holding sealing material contains the binder in an amount of about 0.5% by weight to about 15% by weight.

34. The exhaust gas purifying apparatus according to claim 19, wherein
said binder comprises at least one of an organic binder and an inorganic binder.

35. The exhaust gas purifying apparatus according to claim 34, wherein
said organic binder comprises at least one of rubbers, water-soluble organic polymers, thermoplastic resins, and thermosetting resins.

36. The exhaust gas purifying apparatus according to claim 34, wherein
said inorganic binder comprises at least one of alumina sol and silica sol.

37. The exhaust gas purifying apparatus according to claim 19, wherein
said casing is mainly made of a metal.

38. The exhaust gas purifying apparatus according to claim 19,
wherein
said exhaust gas treating body is an integral exhaust gas treating body configured by one sintered body as a whole.

39. The exhaust gas purifying apparatus according to claim 19,
wherein
said exhaust gas treating body is an aggregated exhaust gas treating body configured by a plurality of sintered bodies combined with each other via an adhesive layer.

40. The exhaust gas purifying apparatus according to claim 19, further comprising a catalyst supported thereon.

41. The exhaust gas purifying apparatus according to claim 40,
wherein
said catalyst comprises at least one of noble metals, alkali metals, alkaline earth metals, and metal oxides.

42. The exhaust gas purifying apparatus according to claim 40,
wherein
said catalyst is supported on a catalyst supporting layer consisting of an alumina film formed on the surface of said exhaust gas purifying apparatus.

* * * * *